United States Patent [19]
Minowa et al.

[11] Patent Number: 5,490,064
[45] Date of Patent: Feb. 6, 1996

[54] CONTROL UNIT FOR VEHICLE AND TOTAL CONTROL SYSTEM THEREFOR

[75] Inventors: Toshimichi Minowa, Toukai; Yoshiyuki Yoshida, Hitachi; Junichi Ishii, Katsuta; Shigeki Morinaga, Hitachi; Hiroshi Katayama, Hitachi; Mitsuo Kayano, Hitachi; Kenichiro Kurata, Katsuta, all of Japan

[73] Assignee: Hitachi, Ltd., Japan

[21] Appl. No.: 280,930

[22] Filed: Jul. 26, 1994

[30] Foreign Application Priority Data

Jul. 26, 1993 [JP] Japan ..................... 5-184101
Nov. 19, 1993 [JP] Japan ..................... 5-290283

[51] Int. Cl.$^6$ .................................................. G06F 9/06
[52] U.S. Cl. ............................. 364/424.01; 364/431.01; 180/197
[58] Field of Search ................. 364/424.01, 424.02, 364/424.03, 426.02, 431.04, 431.01; 180/197

[56] References Cited

U.S. PATENT DOCUMENTS

| | | | |
|---|---|---|---|
| 4,750,123 | 6/1988 | Christian | 364/424.02 |
| 5,163,001 | 11/1992 | Luke, Jr. | 364/424.02 |
| 5,170,352 | 12/1992 | McTamaney et al. | 364/424.02 |
| 5,187,666 | 2/1993 | Watanabe | 364/426.02 |
| 5,280,431 | 1/1994 | Summerville et al. | 364/424.02 |
| 5,367,456 | 11/1994 | Summerville et al. | 364/424.02 |

OTHER PUBLICATIONS

*Electronik* entitled "16–Bit–Controller: Komplett–Paket auf einem Chip" by Eckart Baum, vol. 39, No. 6, Mar. 16, 1990, pp. 61–65.
*Electronik* entitled "'Intelligente' Sensoren im Automobil" by Manuel Alba, vol. 38, No. 20, Sep. 29, 1989, pp. 84–91.
Database WPI, Week 8932, Derwent Publications Ltd., London, Great Britain, Abstract of DE 38 42 100, Aug. 1989.
Patent Abstract of Japanese Publication No. 59–62908, vol. 8, No. 165 (P–291) (1602), Jul. 31, 1984.
Database WPI, Week 8747, Derwent Publications Ltd., London, Great Britain, Abstract of EP 0 871 125 (Chrysler Corp.), Nov. 25, 1987.
*Computer Design* entitled "8–bit microcontrollers specialize for embedded control applications" by John Bond, vol. 26, No. 21, Nov. 15, 1987, pp. 26–32.

*Primary Examiner*—Kevin J. Teska
*Assistant Examiner*—Susan Wieland
*Attorney, Agent, or Firm*—Evenson, McKeown, Edwards & Lenahan

[57] ABSTRACT

A control unit for vehicle is provided where an increase in a number of input/output and upgrading functions can easily be performed and, in addition to this, changing of a program in a control unit can easily be performed even when a single-chip micro-computer is used. A control unit is constructed such as to comprise an interface software memory storing an interface software program for connecting an application software program with an operating system in an internal ROM, a CPU for performing computation of the application software program and the interface software program, a RAM storing data such as the result of the computation, an I/O unit for extending the control unit, and an extending device for communicating memory data through a bus or a LAN. A single-chip micro-computer used in vehicle control can easily cope with an increase in the input/output ports or additional functions, and an application software program can continuously be used only by rewriting an interface software program. Further, re-manufacturing of a core unit is unnecessary. Therefore, development of a control unit including programs becomes easy.

25 Claims, 38 Drawing Sheets

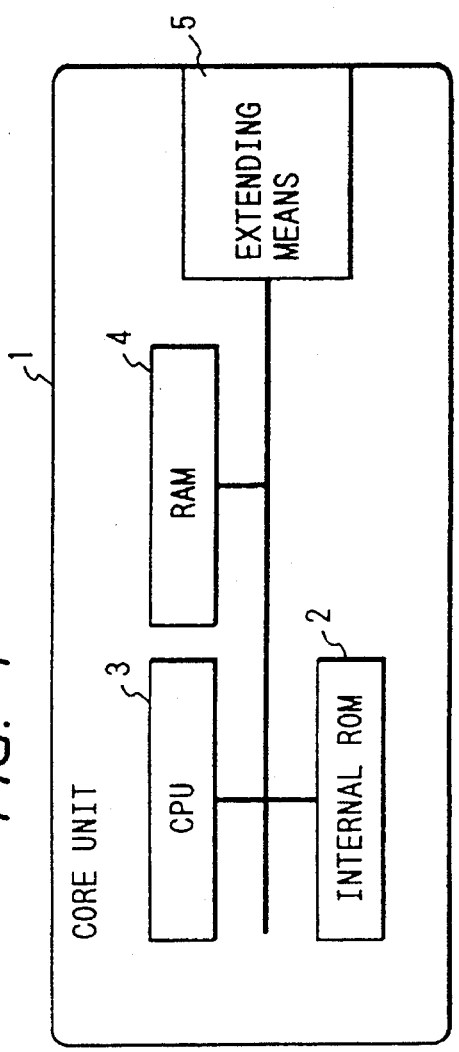
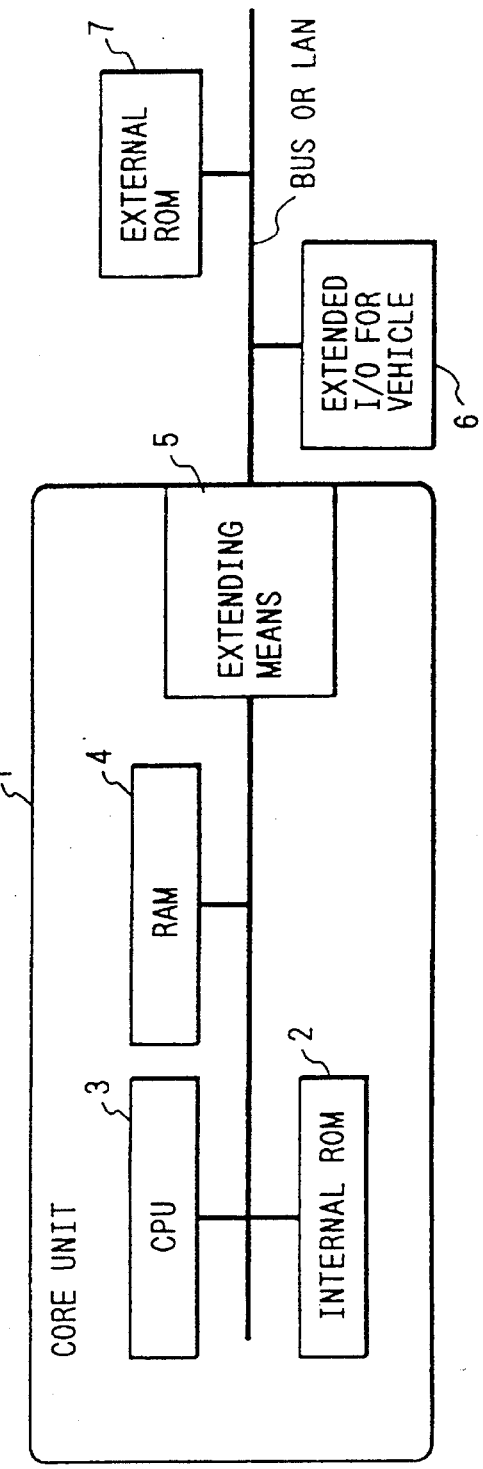

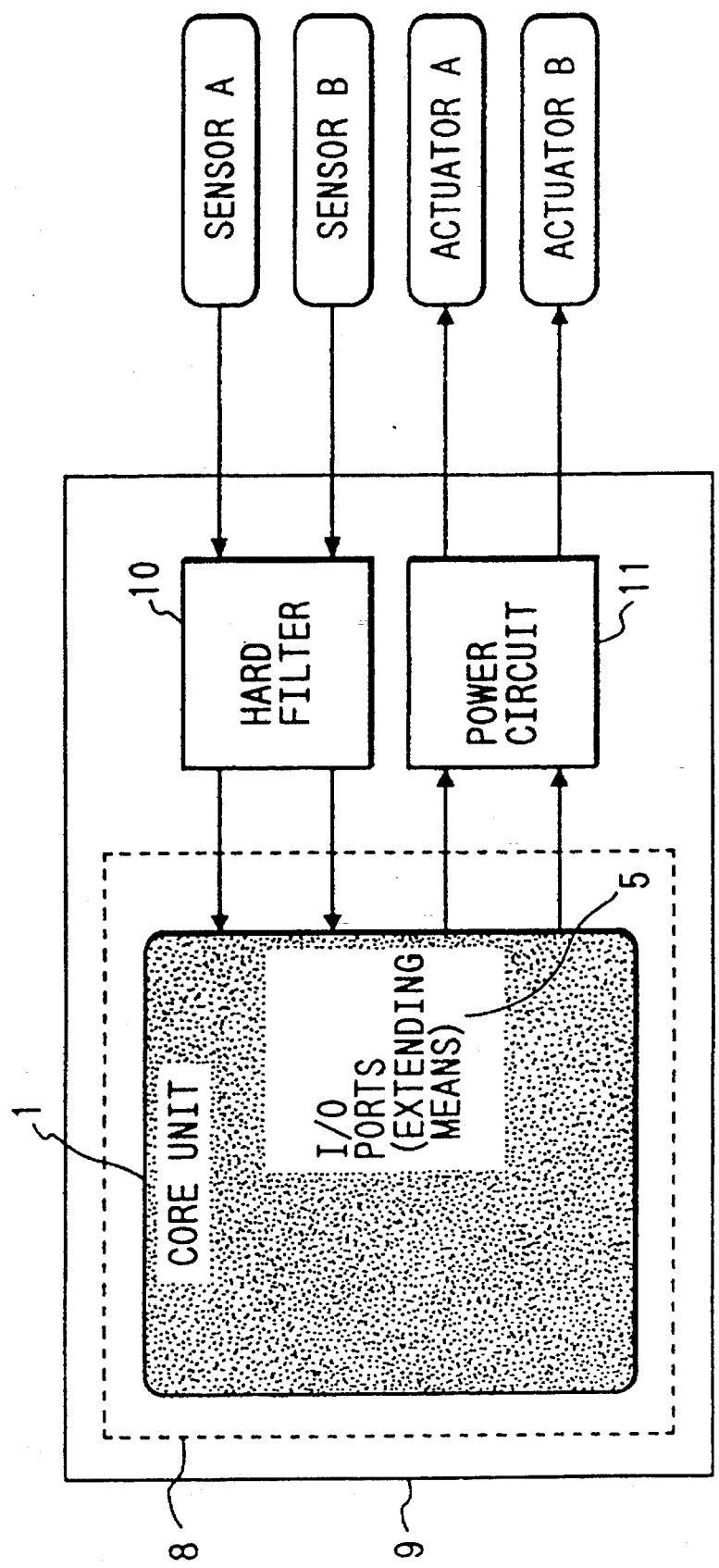

SUCTION PIPE PRESSURE METER, 4-CYLINDER

HW TYPE AIR FLOW METER, 6-CYLINDER

| GEAR POSITION | SOLB | SOLA |
|---|---|---|
| FIRST SPEED | OFF | OFF |
| SECOND SPEED | OFF | ON |
| THIRD SPEED | ON | OFF |
| FOURTH SPEED | ON | ON |

5,490,064

CONTROL UNIT FOR VEHICLE AND TOTAL CONTROL SYSTEM THEREFOR

BACKGROUND OF THE INVENTION

The present invention relates to a control unit for a vehicle and a total control system therefor, and more particularly to a control unit for a vehicle and a total control system therefor so as to control the engine, transmission, brake, electronic throttle, suspension and the like.

In recent years, a control unit having a single-chip microcomputer is used in vehicle control. The single-chip microcomputer incorporates memories (ROM, RAM and so on) required by calculation of the central processing unit (CPU). Therefore, there is an advantage in that the control unit can be miniaturized as a whole, being easy in use and high in processing speed.

However, the conventional technology has a disadvantage in that expanding the control unit is considerably limited when the software and/or hardware happen to be changed due to changes in the control specification. Further, there is a disadvantage in that the software program must be made under hardware limitations when a single-chip micro-computer is used in the vehicle control, and especially whenever fuel cost or cleaning of engine emissions is to be improved, increases in the number of input/outputs and upgrading of functions are indispensable and all the hardware and software needs to be renewed.

Furthermore, since the control software program written in the ROM for performing various controls is represented in an assembler language, the contents and the production technique of the program cannot be understood except by an expert in the field; in other words, such a program is useful only to an individual. Therefore, no one except an initial programmer actually participating in the production stage of the application software program can understand the detailed contents of the software program. When there is a need to add other functions to the application software program, a new program must be written from the beginning.

SUMMARY OF THE INVENTION

The present invention aims to solve the foregoing problem. A first object of the present invention is to provide a control unit for a vehicle wherein an increase in the number of input/outputs and upgrading of functions can easily be performed and, in addition to this, a changing of a program in a control unit can easily be performed even when a single-chip micro-computer is used.

A second object of the present invention is to provide a total control system for the vehicle which makes the best possible use of the processing capacity of a high speed microcomputer, being capable of storing the control programs in the optimum area of a ROM or RAM depending on the load factor of the CPU and constructing a low-cost and reasonable configuration in total using an external memory element, and is suitable for requiring a massive capacity and real-time control such as a total control for vehicle.

The first object of the present invention can be attained by providing a control unit for a vehicle, which basically comprises interface software memory having an internal ROM storing an interface software program for connecting an application software program with an OS (operating system), a CPU (central processing unit) for performing computation of the application software program and the interface software program, a RAM (erasable memory) storing data such as the result of the computation, an I/O unit for extending the control unit, extending means for communicating computed data through communicating means such as LAN, and which is ready for an increase in the number of input/outputs and upgrading of functions.

According to the construction of the present invention, it is easy to cope with an increase in the number of input/outputs and upgrading of functions, and an application software program, can lastingly be used with only rewriting the application software program even when a single-chip micro-computer is used. In addition to this, since renewing of the core unit is not necessary, development of the control unit including the program becomes easy.

The second object of the present invention can be attained by basically providing a total control system for a vehicle having a one-chip microcomputer with an internal ROM, an extended ROM, means for receiving interrupt in a constant cycle or with synchronizing to an output pulse from a rotating sensor, wherein the internal ROM or RAM stores at least one interrupt processing program.

The processing, which requires real-time control is not so much performed by using an extended ROM having a large capacity, connected to a data bus for external access in a microcomputer. On the other hand, the processing having the largest load and being a bottleneck for the CPU among the control programs is performed by storing the process program in a ROM or RAM having small capacity, but being capable of coping with high speed access provided internally in the microcomputer.

BRIEF DESCRIPTION OF THE DRAWINGS

The above-mentioned and other objects and advantages of the invention will be more clearly understood by the following detailed description of the preferred embodiments of the invention in conjunction with the accompanying drawings in which:

FIG. 1 is a schematic view of a core unit;

FIG. 2 is a block diagram showing the construction of a unit when it is expanded;

FIG. 3 is a block diagram showing the construction of a unit when it is not expanded;

DETAILED DESCRIPTION OF THE EMBODIMENTS

Figure 4:
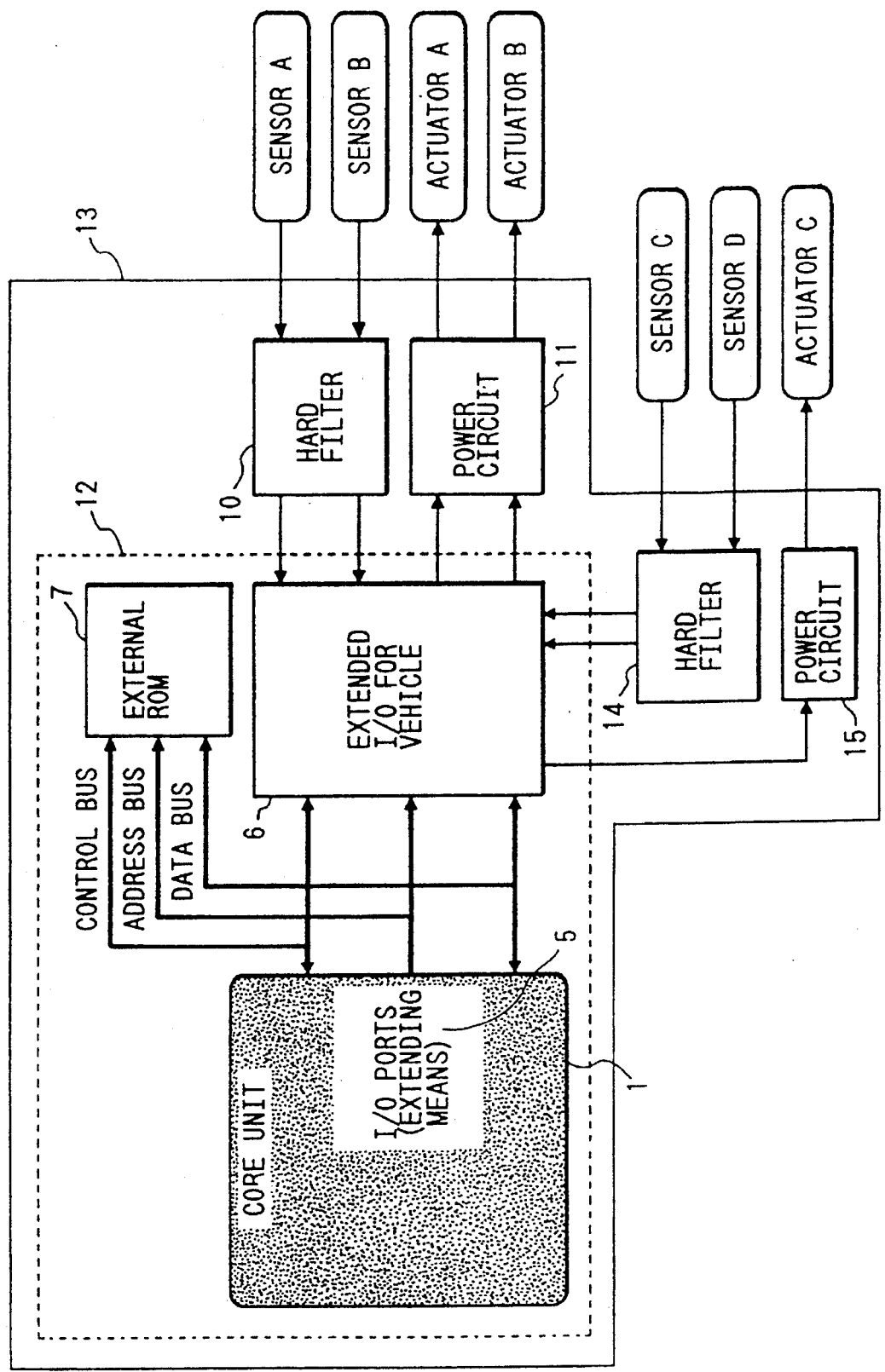
FIG. 4 is a block diagram showing the construction of an embodiment when it is expanded.

The present invention will be described in detail below, referring to accompanying figures, wherein like parts in the accompanying figures are identified by the same reference character. Repetition of the explanation will be omitted.

FIG. 1 and FIG. 2 show embodiments of control units for vehicles in accordance with the present invention.

FIG. 1 shows an embodiment of an outline of a core unit 1. The core unit 1 comprises interface software memory, means having a first memory, that is an internal ROM 2, storing an interface software program for connecting an application software program with an OS (operating system), a central processing unit (CPU) 3 for performing computation of the application software program and the interface software program, a second memory, that is a RAM (erasable memory) 4 storing data such as the result of computation, an I/O (input/output) processor for extending the control unit and extending means 5 for communicating computed data through communicating means.

The interface software program in the internal ROM 2 includes an interrupt service, a task dispatcher, a debugging function, an automatic matching function for learning control, a board allocating function and a standard vehicle I/O unit (to be described later). It is also possible to enter an application software program programmed by a vehicle manufacturer in the internal ROM 2. The extending means 5 is used for the external I/O unit (to be described later) associated with an increase in the number of input/outputs and addition of functions.

FIG. 2 is a block diagram showing the construction of an embodiment of a unit which is extended. In FIG. 2, an extending I/O unit 6 for a vehicle and a ROM 7 are additionally connected to the extending means 5 in the core unit 1 shown in FIG. 1 through a communicating line such as a bus or a LAN (local area network). The extending I/O unit 6 has a software-timer or a hardware-timer. The hardware-timer can be used for highly accurate control to accurately adjust time such as for ignition timing control and fuel control. The software-timer can be used for a rough control such as for meters. The extending I/O unit 6 is, for example, a programmable input/output unit, and is capable of writing data into a register and putting out a signal such as pulse width modulation (PWM) signal using the CPU 3 in the core unit 1. An electrically erasable memory (flush memory, electrically erasable programmable ROM) can be employed as the external ROM.

The core unit 1 shown in FIG. 1 is a version for controlling a four-cylinder engine. In the case of increasing control variables in order to deal with a six-cylinder engine, the control content is stored in the external ROM 7 and the signals due to the increased control variables are output to actuators (not shown) through the extended I/O unit 6.

FIG. 3 and FIG. 4 show other embodiments of the present invention.

FIG. 3 is a block diagram showing the construction of an embodiment of a unit without an extension. In FIG. 3, the core unit 1 without an extension itself becomes a standard unit 8. The extending means 5 is a part of an I/O port, and is, therefore, used as the I/O B. The control ports for communicating with sensors A, B and actuators A, unit 9 comprises a core unit 1, a hard filter 10 for the sensor signals and a power circuit 11 for amplifying the actuator signals.

FIG. 4 is a block diagram showing the construction of an embodiment of a unit with an extension. In FIG. 4, the extending means 5 in the core unit 1 has extensions used as a control bus, an address bus and a data bus. The extending I/O unit 6 for the vehicle and the external ROM 7 are connected to the core unit 1 with the above three buses to construct a standard unit 12. In this case, since the I/O ports of the extending means 5 are used for the extension, the ports for the sensors A, B and the actuators A, B are absent, and therefore it is necessary that the extending I/O unit 6 have ports the number of which includes the number occupied by the core unit 1. Here, for example, supposing sensors C, D and an actuator C are added, the I/O unit 6 must provide the above three ports and in addition, ports for the sensors A, B and the A, B. The control unit 13 comprises a standard unit 12, a hard filter 14 and a power circuit 15 for the sensors C, D and the actuator C, a hard filter 10 and a power circuit 11 for the sensors A, B and the actuators A, B.

Figure 5:
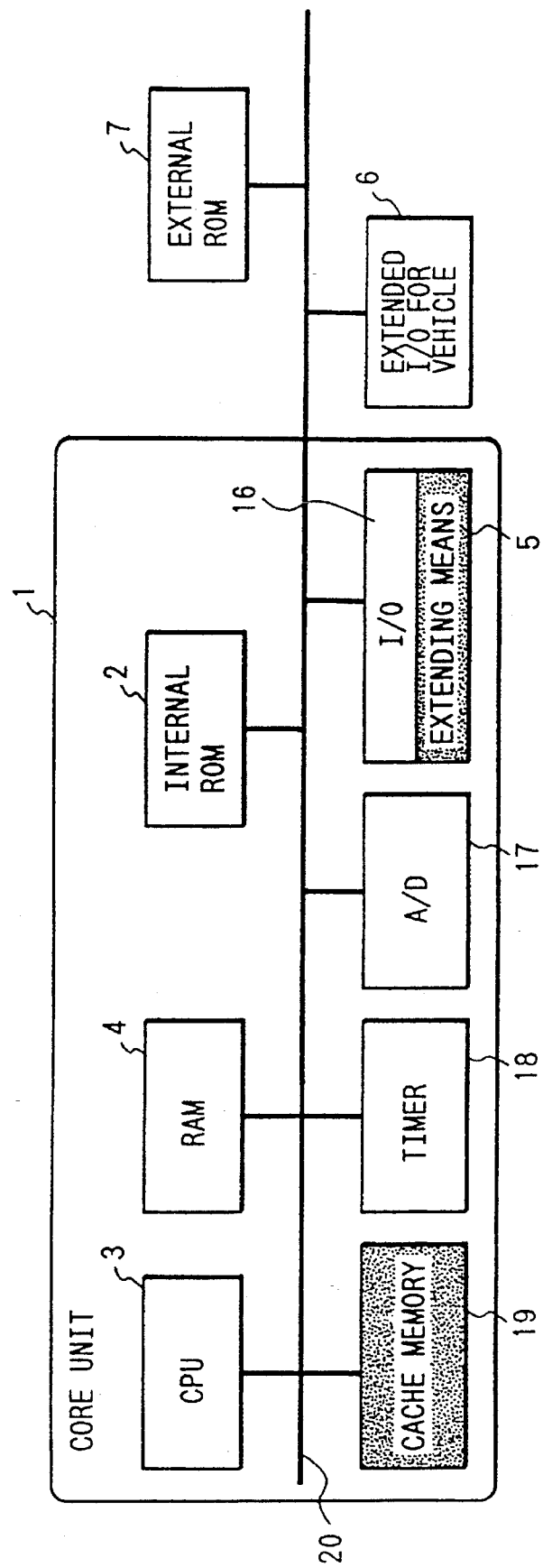
FIG. 5 is a block diagram showing the expanded construction of a core unit itself.

FIG. 5 is a block diagram showing the construction of an embodiment of an extended core unit 1 itself, which is composed of a CPU 3, an internal ROM 2, a RAM 4, an I/O unit 16 containing an extending means 5, an A/D converter 17, a timer 18, an extending I/O unit 6 for the vehicle and a cache memory 19 for performing a high speed access from an external memory such as an external ROM 7. The cache memory 19 serves as a memory to store the data to be read in next from the external ROM 7 in advance. Since the CPU 3 can access the data to be read in next from the cache memory 19 instead of especially accessing the external ROM 7, the time required for reading in the contents of the external ROM 7 can be saved and the response, therefore, can be improved. All of the units are connected with a bus 20.

Figure 6:
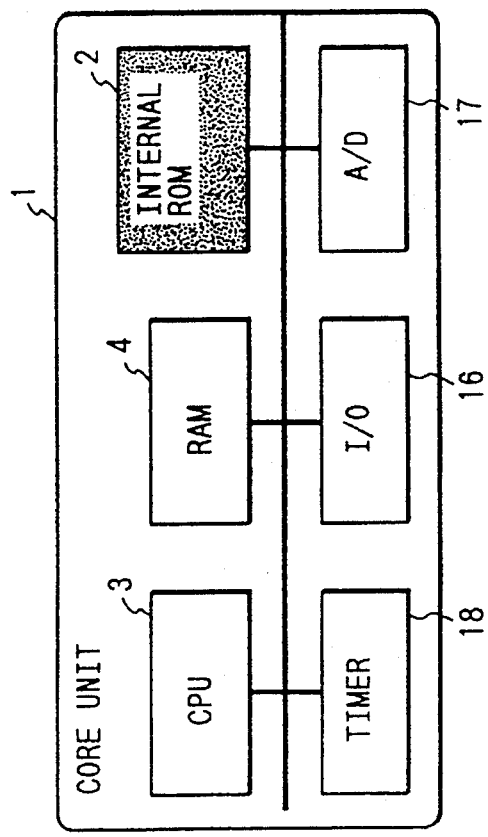
FIG. 6 is a block diagram showing the construction of a standard unit used for a four- or six-cylinder engine.
Figure 7:
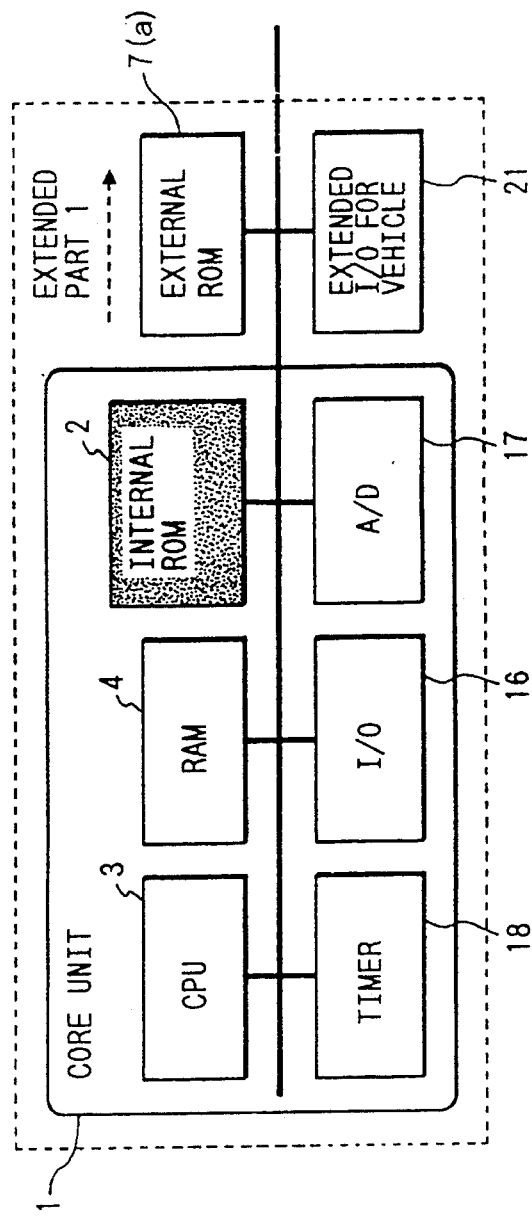
FIG. 7 is a block diagram showing the construction of a standard unit used for a six-cylinder engine added with a failure diagnosis function or for a six-cylinder engine added with an automatic transmission control function.
Figure 8:
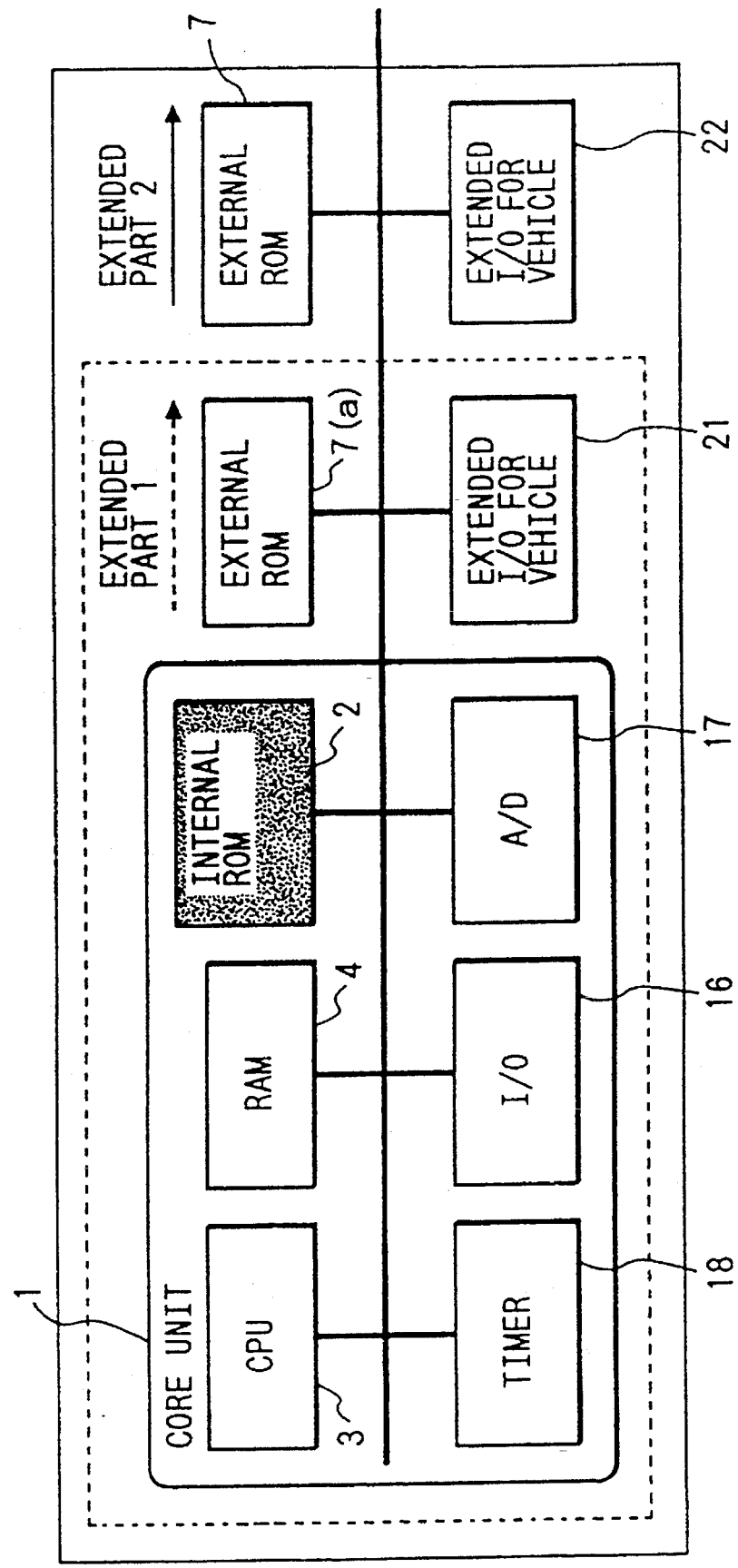
FIG. 8 is a block diagram showing the construction of a standard unit for six-cylinder comprehensive control.

FIG. 6 to FIG. 8 show embodiments of extended constructions corresponding to various specifications.

FIG. 6 is a block diagram showing, for example, the construction of a standard unit for a four- or six cylinder engine. Where the vehicle to be controlled is only a four- or six-cylinder engine control as shown in FIG. 6, only a core unit 1 alone is sufficient, and directly becomes a standard unit, since there are not many items of control and numbers of I/O. In this case, the application software program and the interface software program are written in an internal ROM 2.

FIG. 7 is a block diagram showing the construction of a standard unit for a six-cylinder engine, with a failure diagnosis function or an automatic transmission control function added to the construction in FIG. 6. In FIG. 7, the core unit 1 is provided with an extending I/O unit 21 for the vehicle and an external ROM 7(a) (extension part 1) in order to maintain the number of ports required by the addition of the six-cylinder engine, and maintain the memory associated with the increase in the control items. In this case, the additional software program is stored in the external ROM 7(a). Alternatively, it may be possible to store the interface software program in the internal ROM 2 and the application software program in the external ROM 7(a).

FIG. 8 is a block diagram showing an embodiment of a standard unit for comprehensive control of a six-cylinder engine. In this case, the vehicle has a six-cylinder engine, with various control functions such as failure diagnosis, automatic transmission control, cruising speed driving control, in panel control for meters and so on, (that is, the vehicle enhanced by additional functions of six-cylinder comprehensive control), a further extending I/O unit 22 and an external ROM 7 (extension part 2) are provided, as shown in FIG. 8. In the case where the external ROM's 7 and 7(a) are provided as shown in FIG. 8 (as well as in FIG. 7), the additional software program is stored in the external ROM's 7(a) and 7. Alternatively it may be possible to store the interface software program in the internal ROM 2 and the application software program in the external ROM 7(a) and the external ROM 7. In the latter case, the application software program can be easily debugged since the interface software program and the application software program are separated from each other.

The core unit 1 and the extending means 5 have an advantage in that they can easily cope with an increase in the number of input and output ports and additional functions including software programs as described above.

Figure 9:
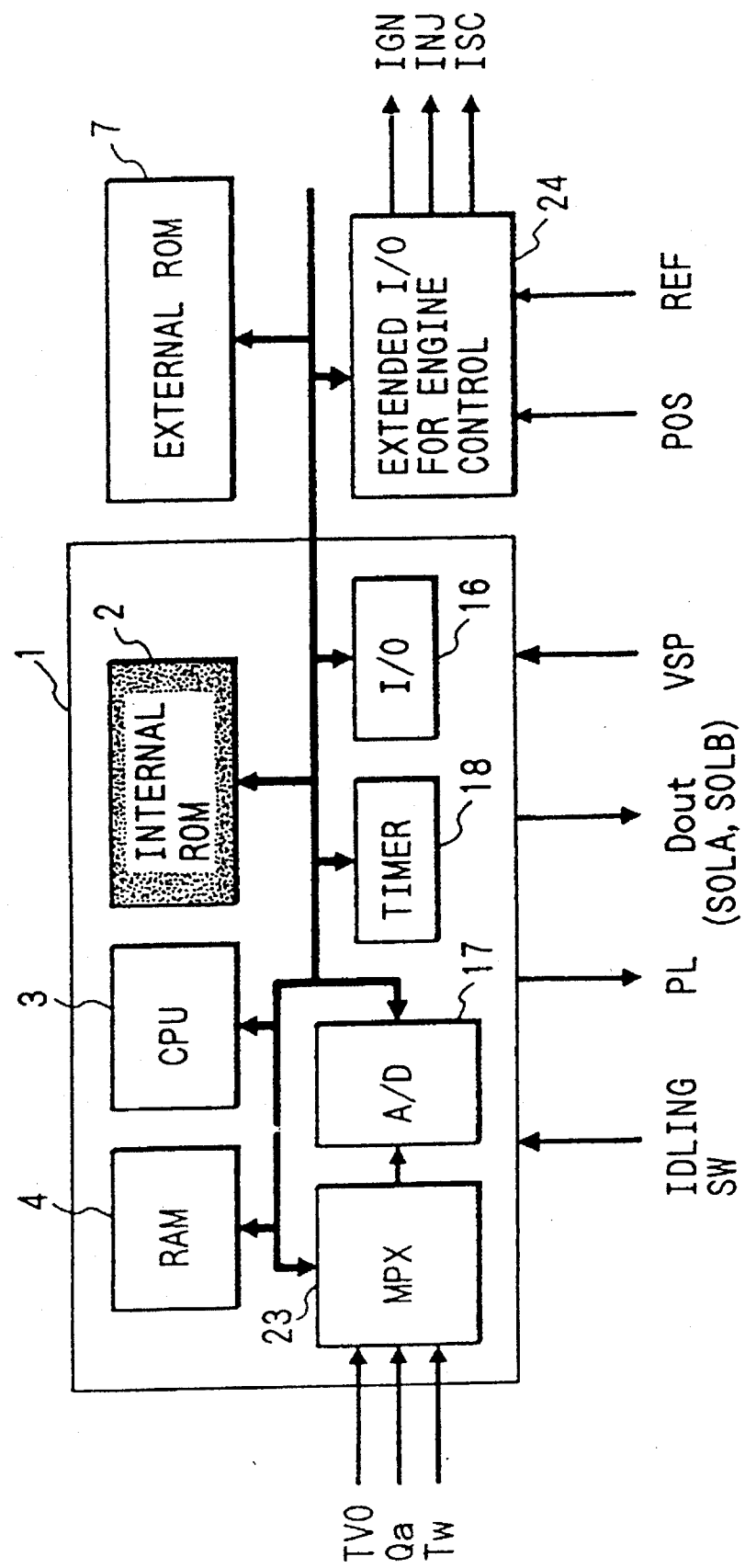
FIG. 9 is a block diagram showing the construction of an engine and AT control unit by using a core unit.

FIG. 9 is a block diagram showing the construction of an embodiment of an engine AT (automatic transmission) control unit using a core unit 1. In FIG. 9, an internal ROM 2 in the core unit 1 stores an application software program requiring high speed calculation for the engine and the AT control (for example, hardware-like interrupt function such as ignition-fuel control) and an interface software program. A multiplexer (MPX) 23 for selecting a plurality of analog signals depending on the state is provided in the core unit 1 in order to use an A/D converter 17 effectively, and performs processing of signals such as throttle valve opening signal TVO, air flow rate signal Qa, water temperature signal Tw and so on. Further, pulse signals such as switch signal (idle signal SW), vehicle speed signal Vsp and so on are input to the core unit. A line pressure PL for controlling the hydraulic pressure of the transmission, solenoid signals solA and solB for controlling the transmission position are output from the core unit 1 as output signals for AT control. Since the engine control uses many timers, an extending I/O unit 24 having additional timers is required. Therein, a rotating signal POS and a cylinder identifying signal REF of the engine are entered into the extending I/O unit 24, and a fuel injection rate signal INJ, an ignition timing signal IGN and an idle control signal ISC are output. An application software program (for example, transmission point control, lock-up control), which can be satisfied with slow speed calculation of the engine AT control is written in the external ROM 7.

Figure 10:
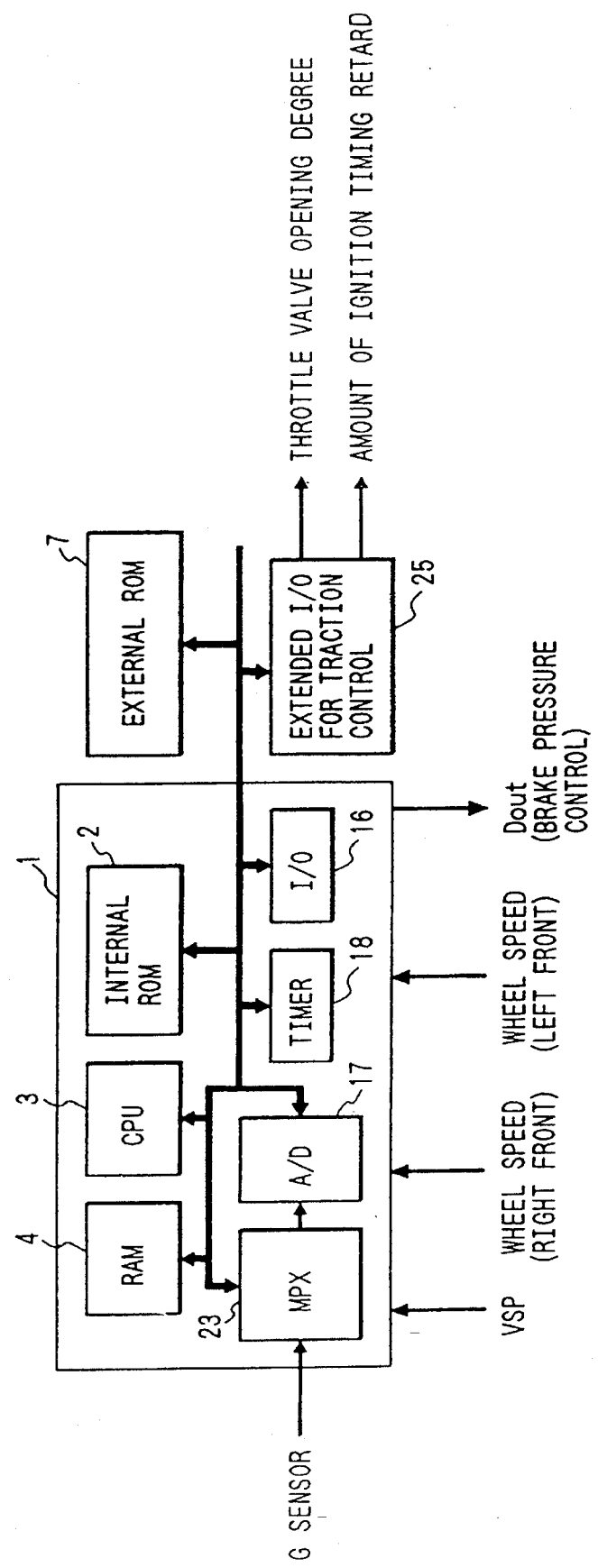
FIG. 10 is a block diagram showing the construction of an ABS and traction control unit by using a core unit.

FIG. 10 is a block diagram showing the construction of an embodiment of an ABS (anti-skid brake system) traction control unit using a core unit 1. An internal ROM 2 n the core unit 1 stores an application software program for the ABS control, and an interface software program required for the ABS and traction control. A multiplexer (MPX) 23 for selecting a plurality of analog signals depending on the state is provided in the core unit 1 in order to use an A/D converter 17 effectively, and performs processing of signals such as a G (acceleration) sensor signal for obtaining an absolute speed of the vehicle. Further, pulse signals such as vehicle speed signal Vsp (that is, speed of the driving wheel), wheel speed signals right front and left front, (speed of the non-driving wheel) are input to the core unit. A PWM signal Dout for control of the brake pressure is output as an ABS control. In a case of adding a traction control function, a throttle opening degree signal and an ignition timing retard signal are output using an extending I/O unit 25 for traction control. An application software program for traction control is stored in the external ROM 7. In this embodiment, a standardized unit for ABS control is constructed and extended so as to perform traction control.

An embodiment in which a LAN (local area network) connects between control units will be described below.

Figure 11:
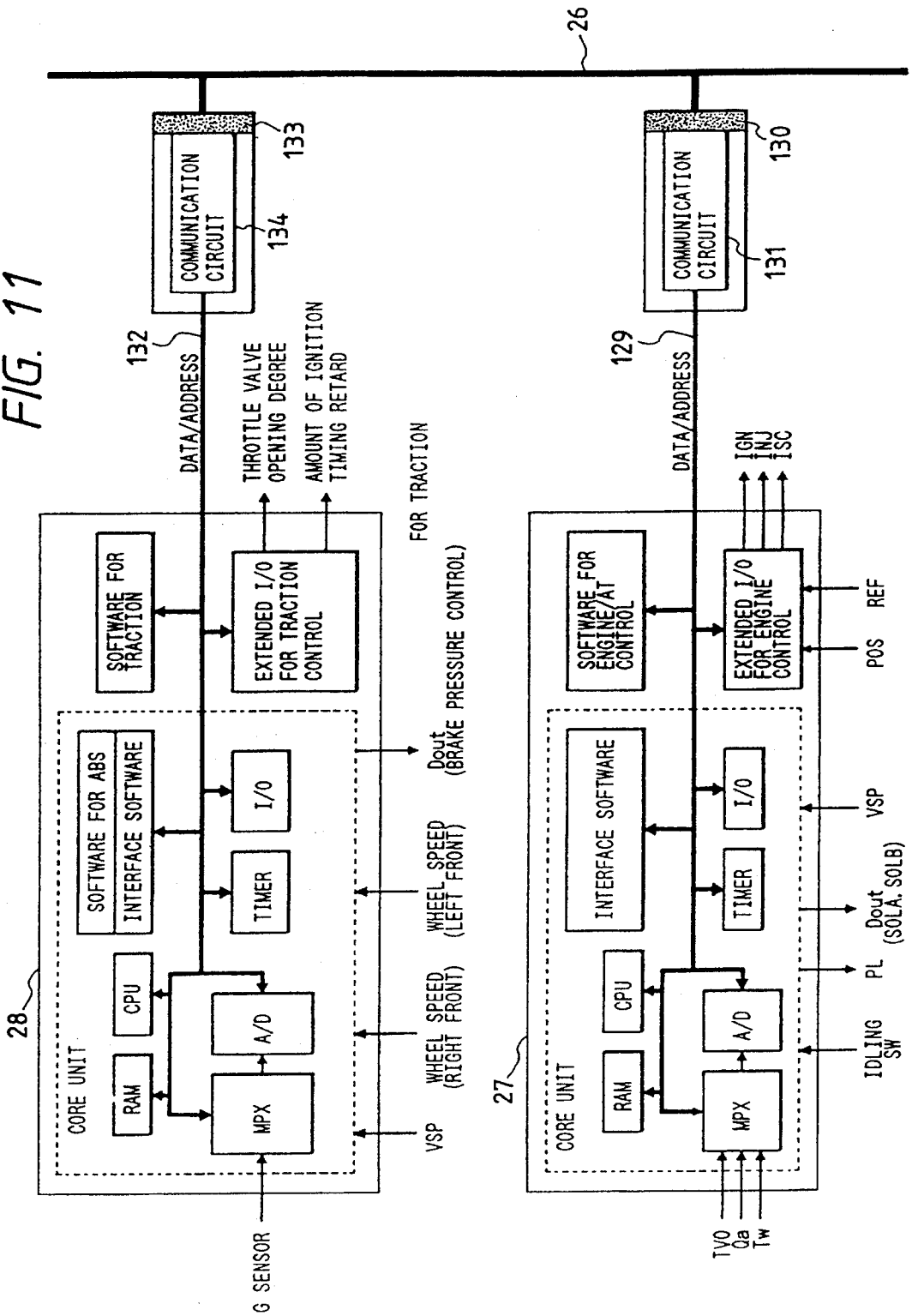
FIG. 11 is a block diagram showing the construction of a system using a LAN (local area network)

FIG. 11 is a block diagram showing the construction of an embodiment of a system in which an engine AT control unit and an ABS traction control unit are connected with a LAN in a vehicle having both units. The engine AT control unit 27, the ABS traction control unit 28 and so on shown in FIG. 7 and FIG. 8 are connected by the LAN (data communication line) 26. The data communication between the LAN 26 and a bus 129 in the control unit 27 is performed through a communication connector 130 and a communication circuit 131. For example, data such as an engine torque calculated by the engine AT control unit 27 is transmitted to the ABS traction control unit 28, and an engine torque decreasing control (decreasing throttle opening degree, retarding in ignition timing and decreasing in fuel flow rate) at wheel slipping time is performed by engine feedback control to improve control accuracy.

Figure 12:
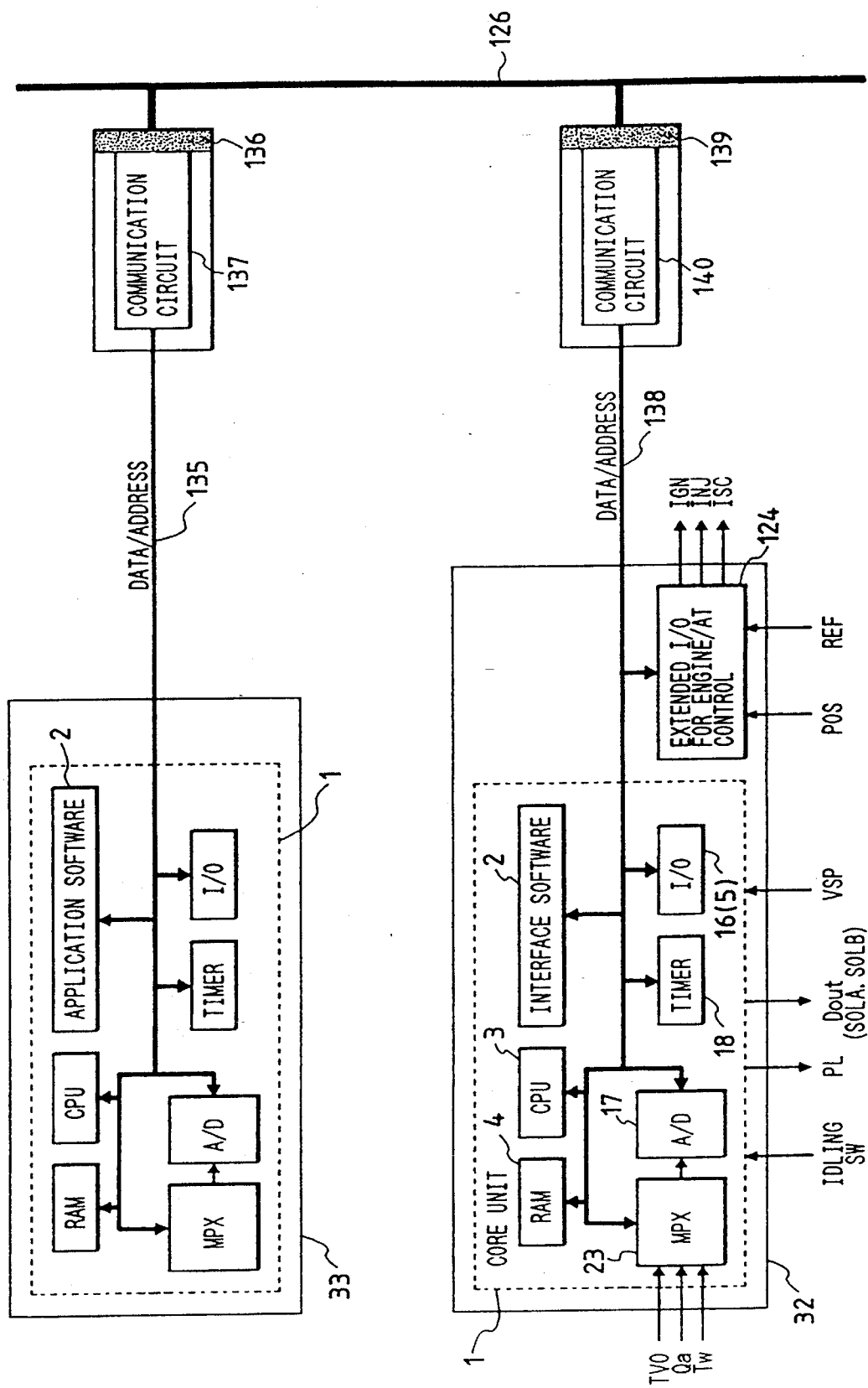
FIG. 12 is a block diagram showing the construction communicating between a computing unit and an I/O unit using a LAN.

FIG. 12 is a block diagram showing the construction of an embodiment where a calculating unit 33 and an I/O unit 32 are separated and the communication between them is performed with a LAN 126. The I/O unit 32 is composed of a CPU 3, an internal ROM 2, a RAM 4, an I/O unit 16 containing an extending means 5, an A/D converter 17, a timer 18, an MPX 23 and an extending I/O unit 124 for engine AT control. The signals received from sensors are treated with a filtering process (not shown) and an A/D converting process in the I/O unit 32, and the processed data are transmitted through the LAN 126 to the calculating unit 33, where a fuel injection width INJ, an ignition timing IGN, an idle control value ISC, a line pressure PL in transmission are calculated using the received data, and the calculated results are transmitted to the I/O unit 32 through the LAN 126. Then the output signals described above are output from the I/O unit 16 in the core unit 1 storing the interface software program and from the extending I/O unit 124 for engine AT control. In this case, since the calculating unit 33 uses the same core unit 1 as the I/O unit 32, the calculating unit has the same function as the I/O unit. However, the application software program used in the calculation is stored only in the internal ROM 2 in the calculating unit 33. The communication between the LAN 126 and the units 32, 33 is performed through communication connectors 136, 139 and communication circuits 137, 140, respectively. The communication connectors 136, 139 and the communication circuit 137, 140 are each operated by the command of the CPUs in the control units.

As described above, in the embodiment illustrated in the figure, the interface software program, that is, an I/O processing software program is stored in the internal ROM 2, and the I/O unit 32 is constructed in a unit. Therefore, identical signals (overlap signals), for example, such as the signals to be put into the ABS traction control unit and the engine AT control unit, can be unified to be put in the I/O unit 32, which leads to the sharing of I/O and decrease in parts count.

The outline of the interface software program will be described below, referring to an embodiment.

As described above, the interface software program is a software program for interfacing between an OS and an application software program. Therefore, the manufacturer supplying the application software program can construct the application software program without taking the OS into consideration, makes the software development easier.

FIG. 13 to FIG. 17 show a comparison of input signal processing by the control unit.

Figure 13:
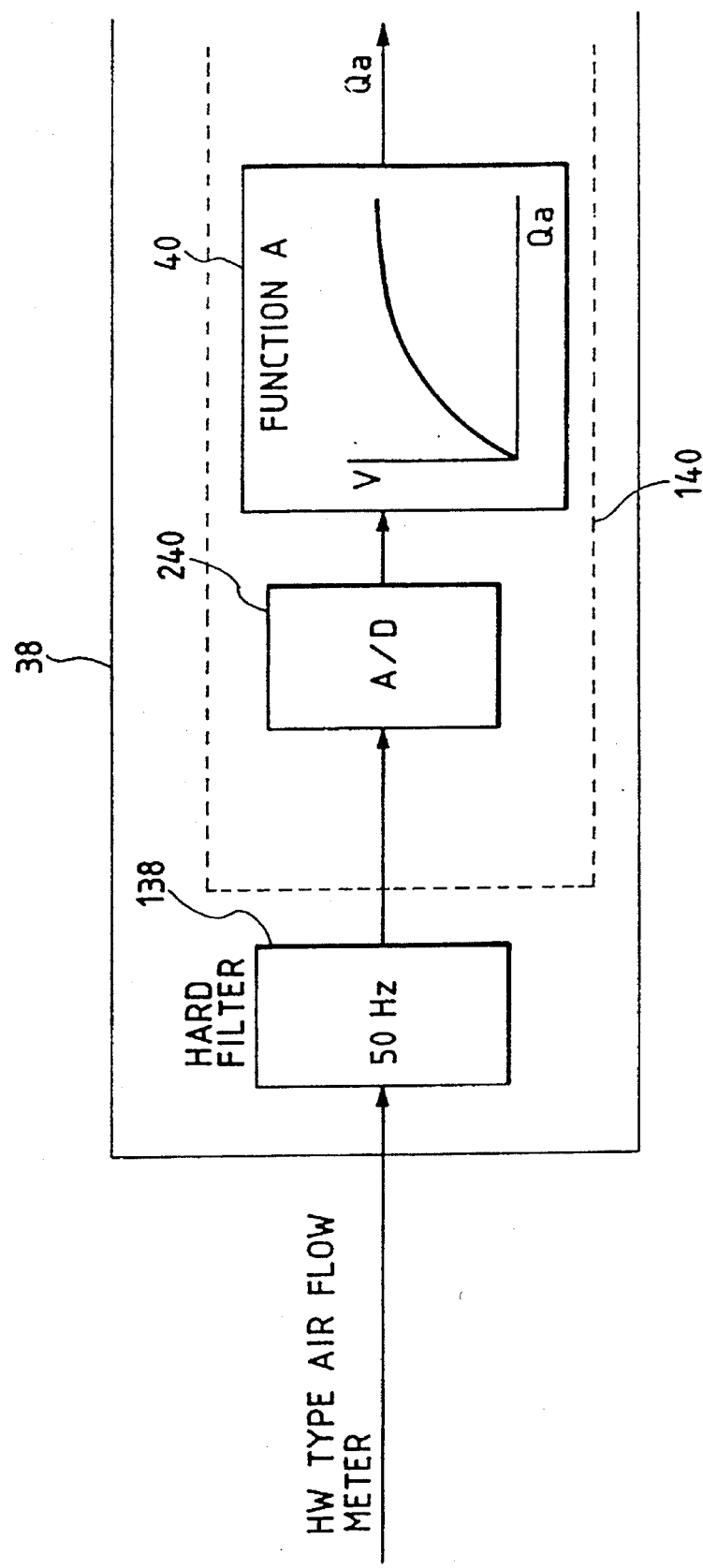
FIG. 13 is a block diagram showing the construction of a conventional signal processor for sensor (HW type)
Figure 14:
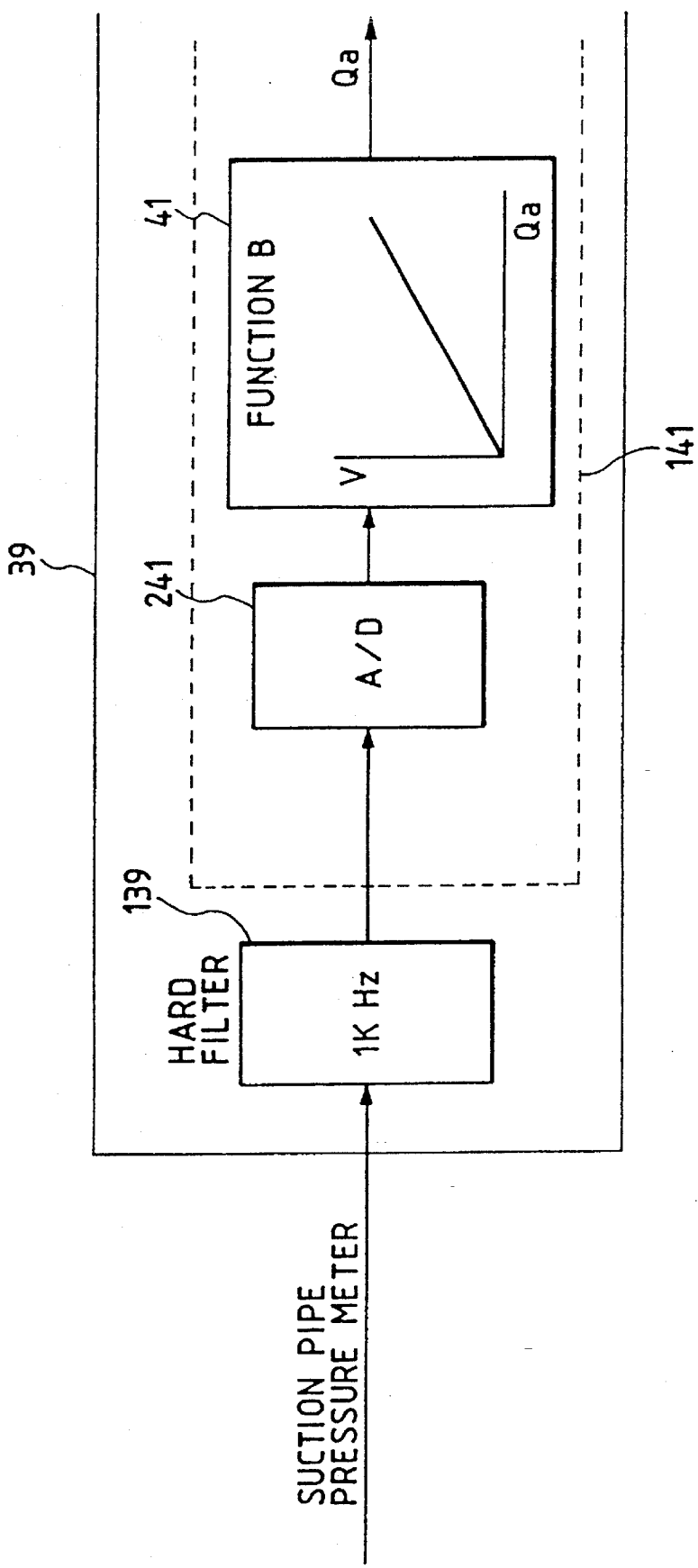
FIG. 14 is a block diagram showing the construction of a conventional signal processor for sensor (suction pipe pressure type)

FIG. 13 and FIG. 14 show the conventional processing structures of an air flow rate sensor signal. FIG. 13 shows a case where a hot wire (HW) type air flow meter is used in detecting and calculating the air flow rate Qa. The signal from the air flow meter is first filtered with a hard filter 138 provided in the control unit 38 to remove noise, and is then provided to an A/D converter 240 in a single-chip micro computer 140. The signal converted by the A/D converter 240 is converted into an air flow rate Qa with a function A40. On the other hand, in a case of a suction pipe pressure meter type flow meter is used as shown in FIG. 14, the signal is filtered by a hard filter 139 which differs from the hard filter used in the case of the air flow rate meter) to remove noise, and is provided to an A/D converter 241 in a single-chip micro computer 141. The signal converted with the A/D converter 241 is converted into an air flow rate Qa by means of a function B 41.

Figure 15:
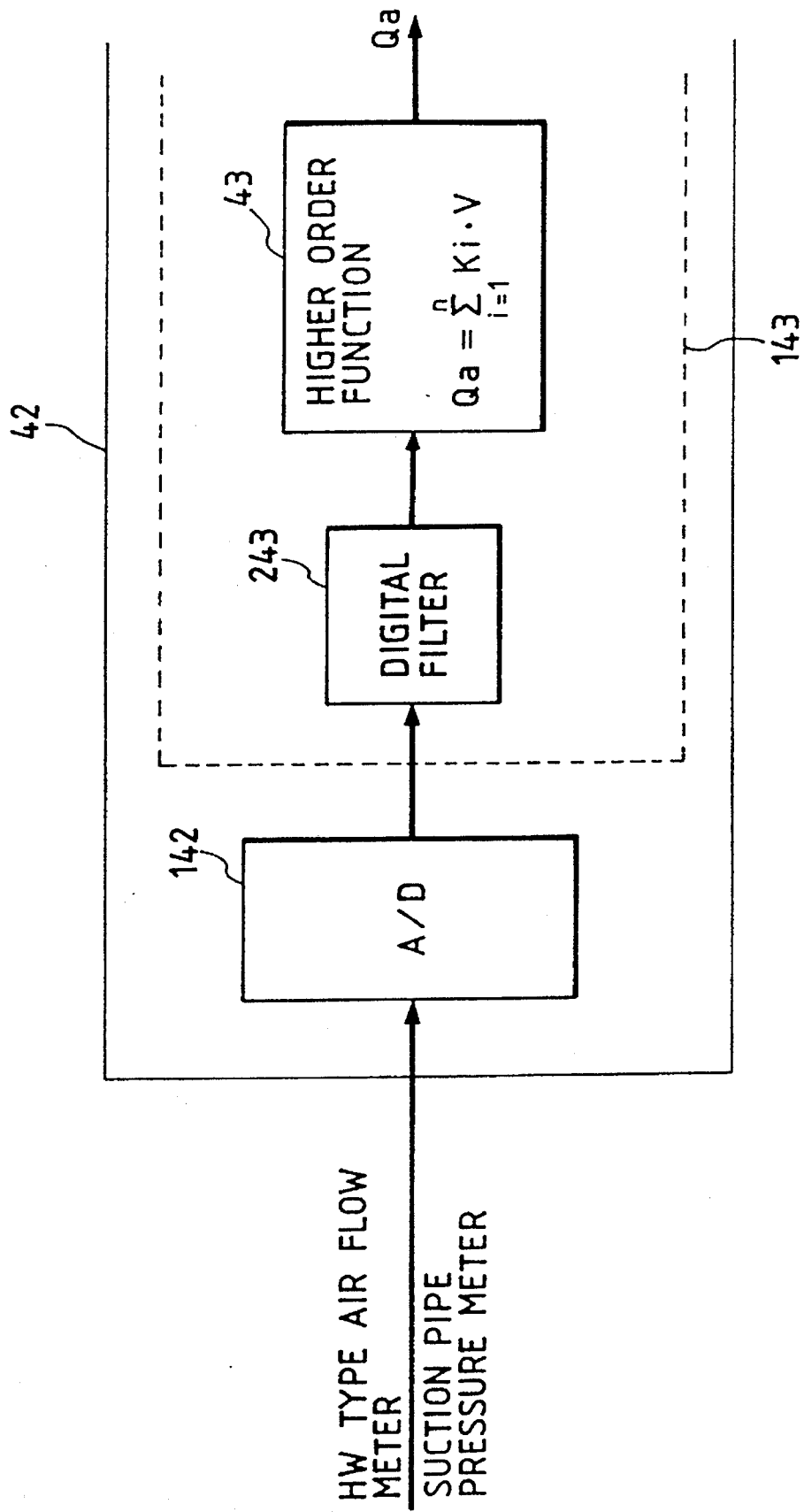
FIG. 15 is a block diagram showing the construction of an input signal processor in a standard unit mounting an internal ROM having an interface software program.

FIG. 15 shows an embodiment for input signal processing using a standard control unit 42 having an internal ROM 143 for storing an interface software program. The standard control unit 42 can control either the HW type air flow meter sensor shown in FIG. 13 or the suction pipe pressure meter type flow meter sensor shown in FIG. 14, since the interface software program in the internal ROM 143 can execute the filtering and the function processes for both of the above two sensors. The input signal is first digitized by the A/D converter 142 in the standard unit 42, and is provided to the interface software program in the internal ROM 143. The signal is then processed using a digital filter 243 instead of the hard filters 138, 139. The cut-off frequency is set with software corresponding to each of the sensor signals. Further, instead of using functions having different characteristics depending on the sensor signals each, a higher order function 43 ($Qa = \Sigma K_i * V$, $K_i$: coefficient of i-th degree, V: digitized voltage signal) is used and the coefficient of i-th degree $K_i$'s are set corresponding to each of the signals to produce each of the functions corresponding to each of the signals and to calculate the air flow rate Qa. By doing this, it becomes possible to switch various kinds of sensor signal inputs with the case of software. In other words, the characteristics of the functions A and B described above can be produced with the higher order function 43 by the interface software program, and the Qa can be calculated through any type of sensor using an identical port.

Figure 16:
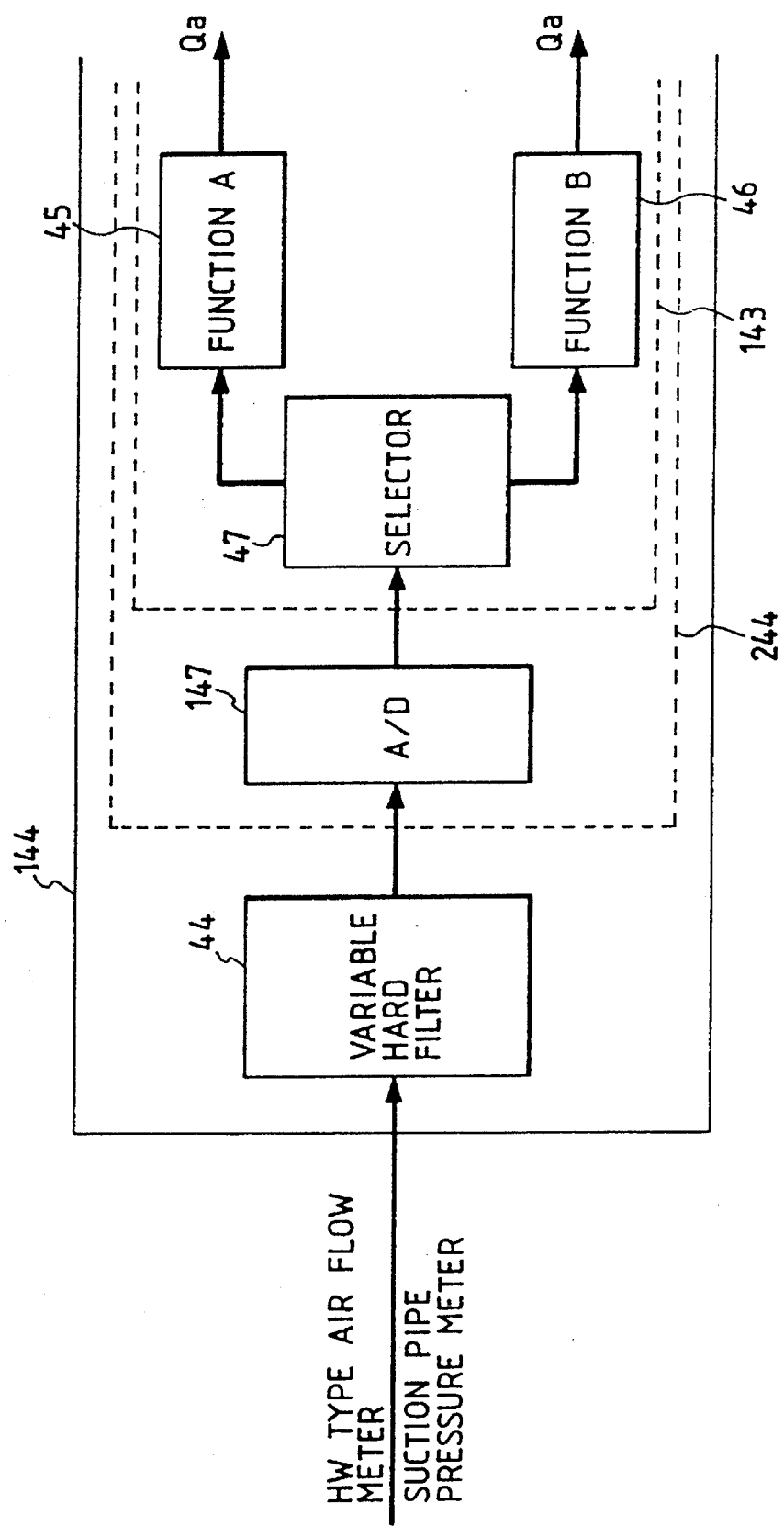
FIG. 16 is a block diagram showing the construction of an input signal processor using a variable hard filter.

FIG. 16 shows an embodiment for input signal processing using a variable type hard filter. A control unit 144 has a standard unit 244 and a variable type hard filter 44 with, variable resistances depending on the kind of sensor signal, as well as to the signal with performing filtering corresponding varying of the cut-off frequency. The standard unit 244 also has an A/D converter 147 and an interface software program (functions A, B and so on). The signal to be input is first noise filtered with the variable type hard filter 44, and is input to the standard unit 244 stores functions unit 244, which stores functions corresponding to each of the sensor signals, for example, calculating functions such as the function A 45 for an HW type air flow meter, the function B 46 for a suction pipe pressure meter type flow meter. The air flow rate Qa is calculated by selecting the function corresponding to the input sensor signal using a selector 47.

Figure 17:
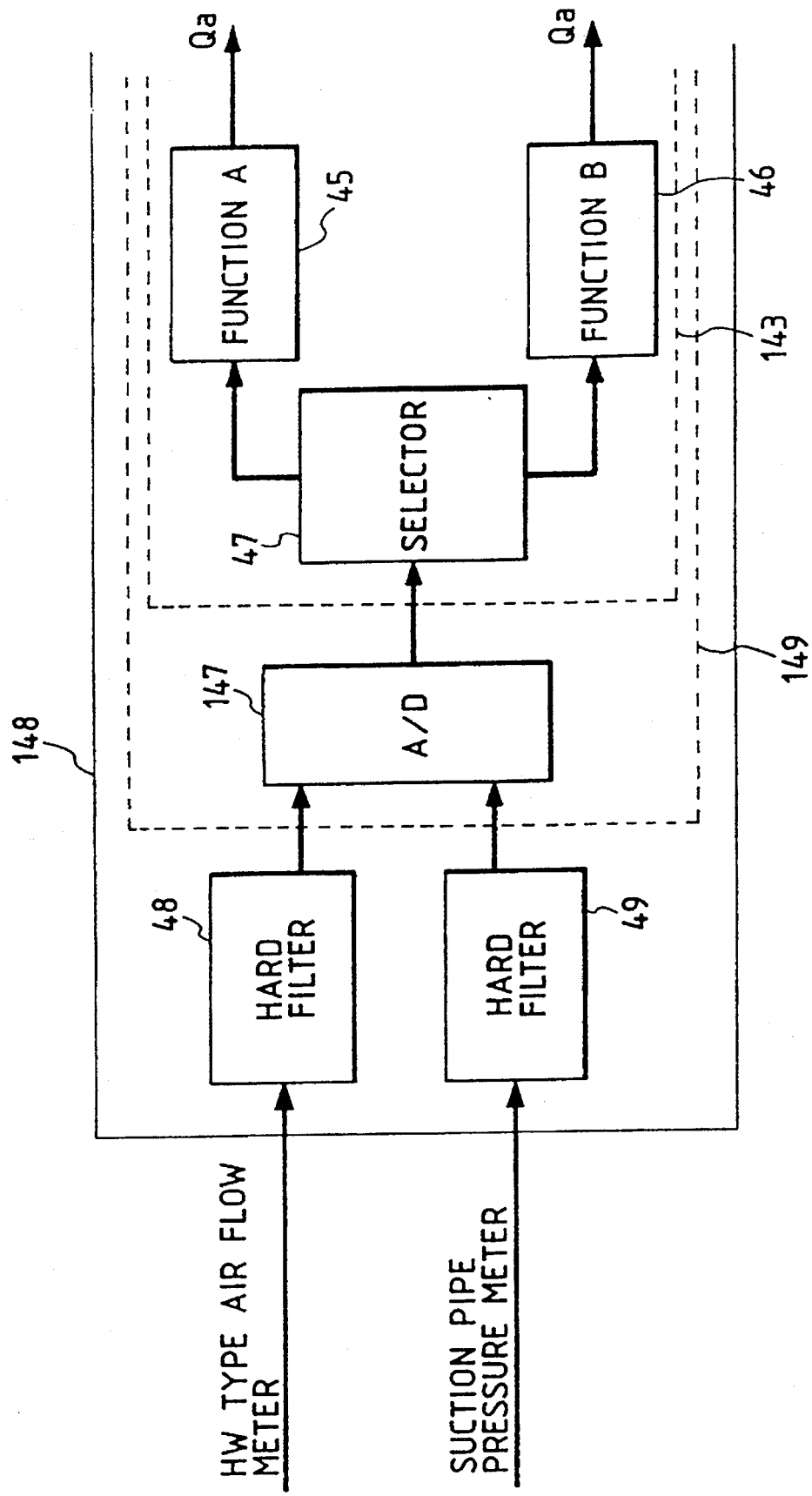
FIG. 17 is a block diagram showing the construction of an input signal processor having individual hard filter for each of utilizing sensors.

FIG. 17 shows an embodiment having separate hard filters for each for using sensors. The control unit 148 has input terminals for various sensors (HW type air flow meter, suction pipe pressure meter type flow meter) and sensor-specific hard filters 48, 49, and also has a function A 45, a function B 46 and a selector 47 to calculate the air flow rate Qa.

Figure 18B:
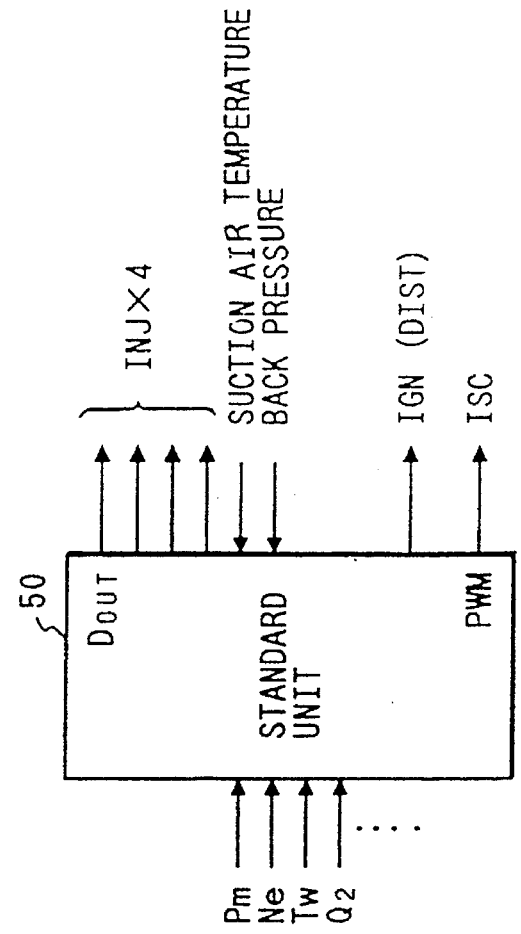
FIG. 18 is a schematic diagram showing a port allocating function by the interface software program.
Figure 18A:
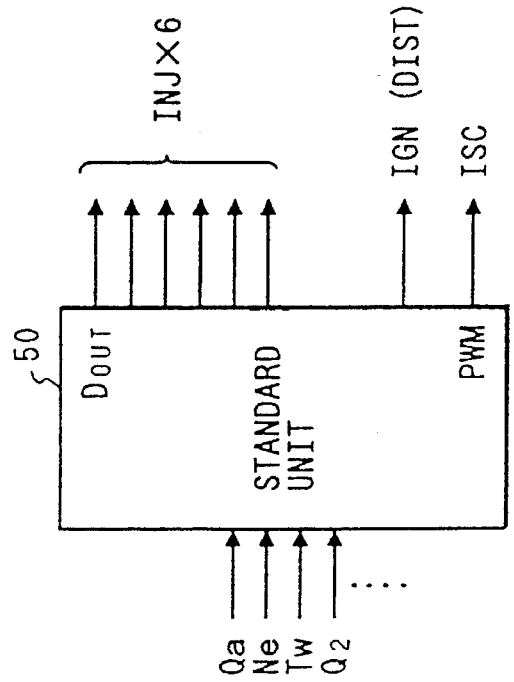

FIG. 18 is a schematic depiction of port allocating functions by the interface software program. FIG. 18(a) shows an example of the construction of input/output port allocation for a six-cylinder engine control with an HW type air flow meter using a standard unit 50. FIG. 18(b) shows an example of the construction of input/output port allocation for a four-cylinder engine control with a suction pipe pressure meter type flow meter using a standard unit 50.

In FIG. 18(a), the input/output ports are allocated to the input signals such as HW type air flow meter signal Qa, engine rotating speed signal Ne, water temperature signal Tw, oxygen sensor signal 02 and to the output signals such as fuel injection INJ for six cylinders, DIST (distributor) type ignition IGN, and idle speed control ISC. Where the standard unit 50 is used for a four-cylinder engine having the specification of FIG. 18(b), there are two excess ports signals for six cylinders 20 since six of the INJ pulse decreases to four for four cylinders. However, in a case of an engine control using a suction pipe pressure meter, suction air temperature correction and back pressure correction are required in the calculation of the air flow rate. By using the two excess ports as input ports for the suction air temperature and the back pressure, the standard unit 50 can effectively be utilized.

In FIG. 18(b), an input port is allocated to the suction pipe pressure signal Pm instead of the air flow rate signal Qa. By means of such a port allocating to the interface software program in the standard unit 50, an effective utilization of the unit can be realized. Concerning receiving the signals of the suction air temperature and the back pressure, flexibility of the unit can be realized by installing a hardware multiplexer or the like between the standard unit 50 and the sensors. As described above, a change in input/output signals can be efficiently performed by the port allocating function of the interface software program even when the specification of an engine or the specification of the sensor is changed.

Figure 19:
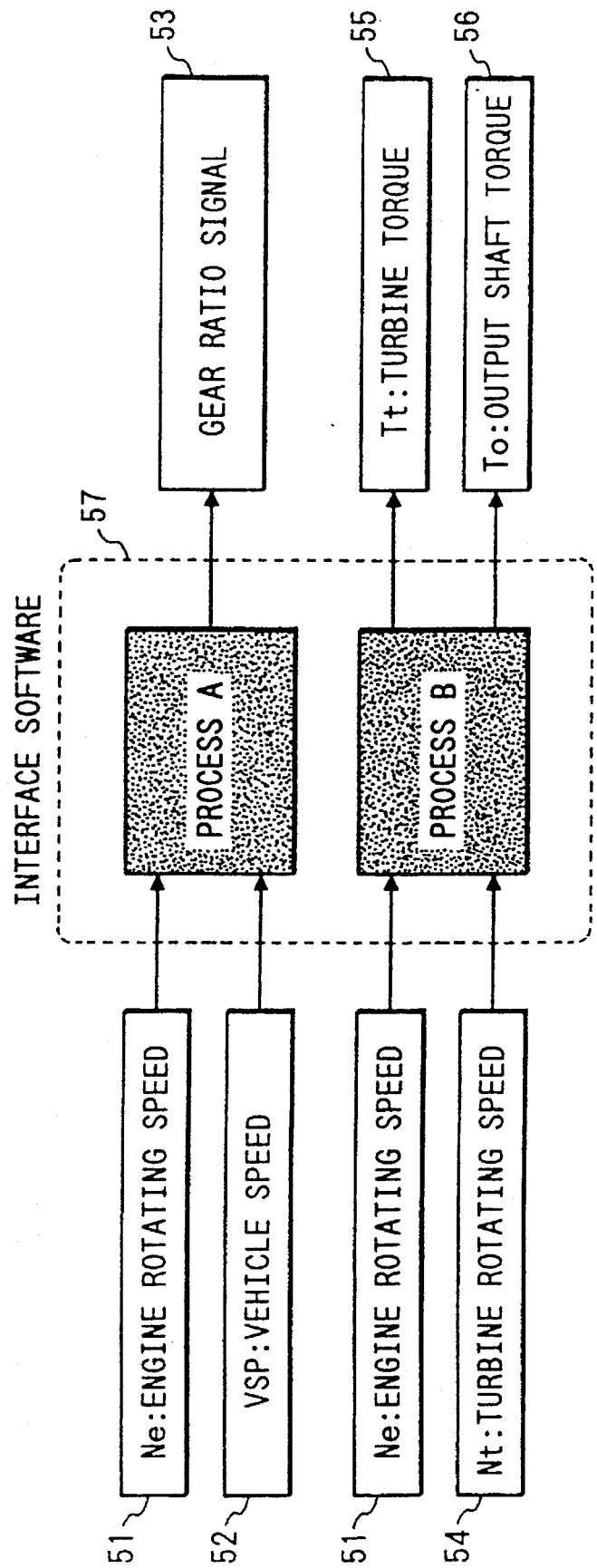
FIG. 19 is a block diagram showing an input signal combination process by the interface software program.

FIG. 19 is a block diagram showing the construction of input signal "combination processing" of the interface software program. The combination processing means a process to combine input signals from sensors to form a different signal, and is executed by the interface software program 57. For example, a gear ratio signal 53 is calculated from an engine rotating speed signal 51 and a vehicle speed signal 52, through a process A, and a turbine torque 55 and an output shaft torque 56 are calculated from an engine rotating speed signal 51 and a turbine rotating speed signal 54, through a process B. By allocating such a processing function to the interface software program 57, a user (that is, a person who develops an application software program) can look at the content of data such as the gear ratio stored in each of the addresses in a RAM freely and at any time whenever he accesses the data. By employing such combination processing, it may be managed without adding new sensors when required parameters happen to increase due to an increase in future control items.

Figure 20:
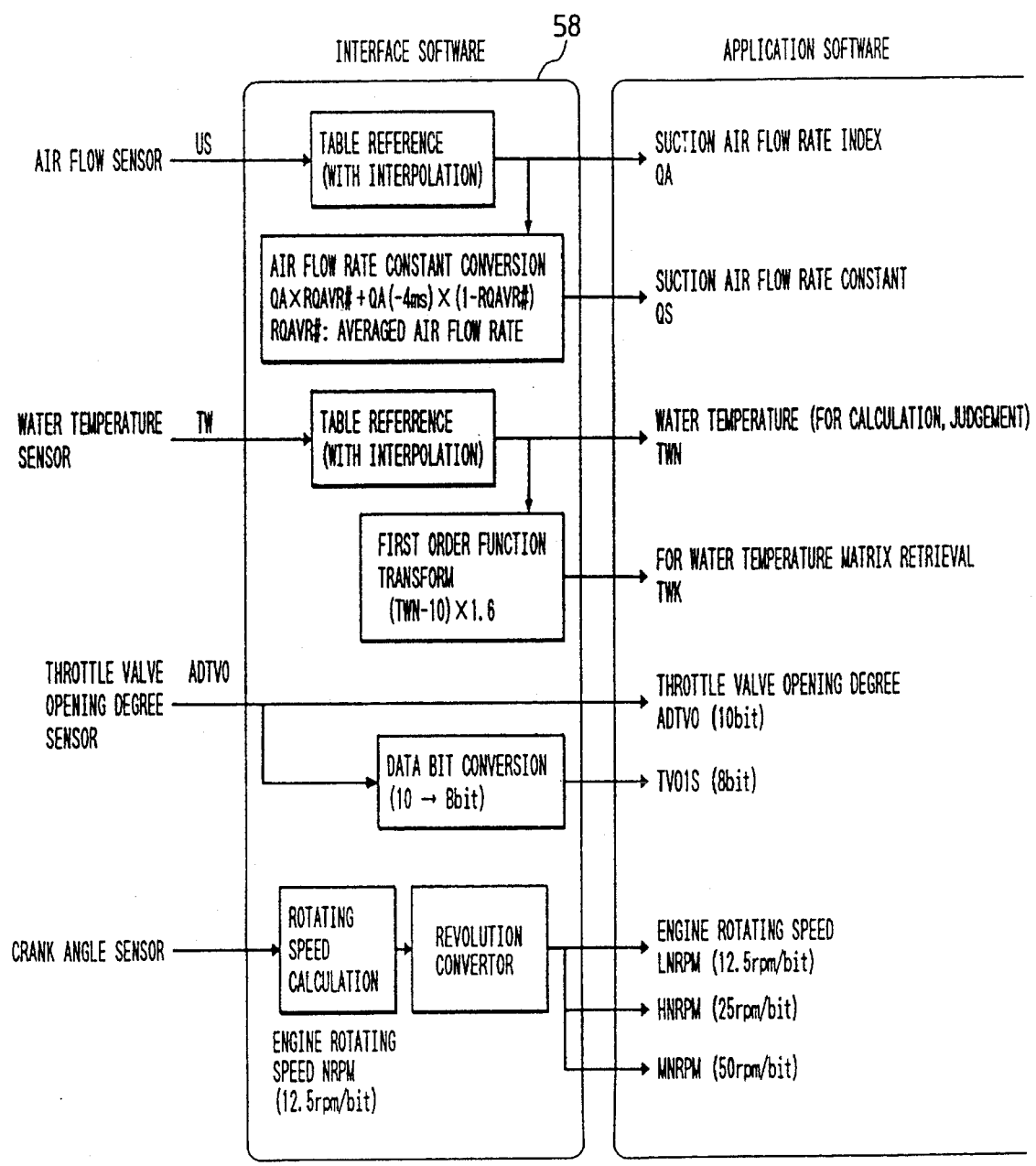
FIG. 20 is a block diagram showing calculating process function at receiving a sensor signal by the interface software program.

FIG. 20 shows an example of a calculating process function of the interface software program at a receiving sensor signal. In known engine controls, an application software program does not directly deal with the signal processed values such as A/D converted values or pulse counted values of signals from an air flow rate sensor, a water temperature sensor, a throttle valve opening degree sensor and a crank angle sensor. For example, a signal from an air flow rate sensor cannot obtain a suction air flow rate index QA usable in an application software program unless the signal is once interpolated with reference to a table.

Software development becomes easy by giving the interface software program a calculating function of signals required by the application software program such as air flow rate index QA, suction air flow rate constant QS, water temperature TWN, water temperature for matrix retrieval TWK, throttle valve opening ADTVO, TVO1S and engine rotating speed LNRPM, HNRPM, MNRPM. The data in the application software program can be seen at any time when the data is accessed by means of storing the data, air flow rate index QA, suction air flow rate constant QS, water temperature TWN, water temperature for matrix retrieval TWK, throttle valve opening ADTVO, TVO1S and engine rotating speed LNRPM, HNRPM, MNRPM, in the RAM.

An embodiment of the interface software program, that is, a flow of the source code listing will be described below.

Figure 21:
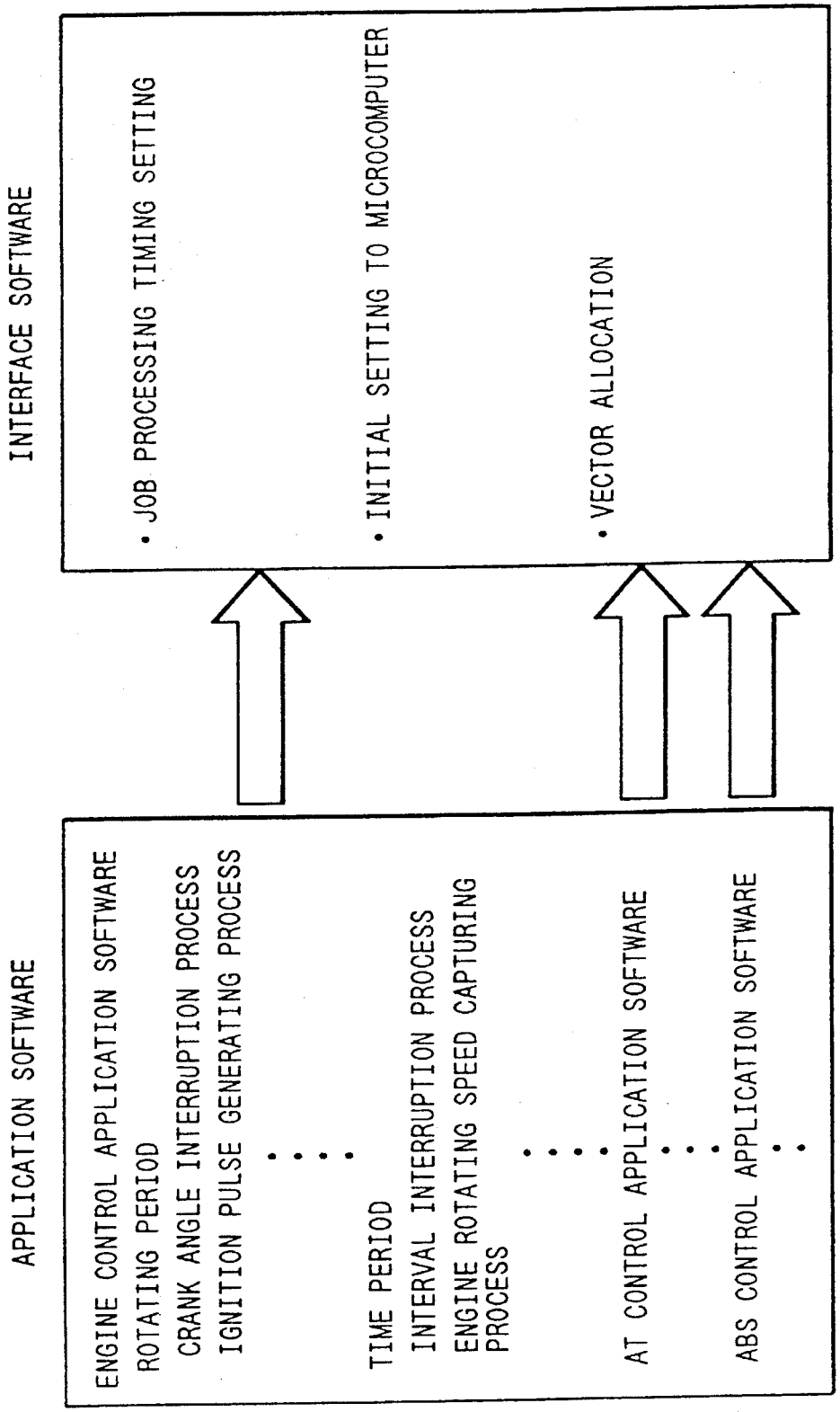
FIG. 21 is a schematic diagram showing time shearing by the interface software program.

FIG. 21 is a schematic diagram showing an embodiment of time sharing by the interface software program. The software program for vehicle control has tasks and subroutines for various kinds of control starting at various timings, and each of the tasks or the subroutines serves in a certain period. Since description in C language is not suitable for time management and time sharing, an automatic sharing function is provided in the interface software program. An application software program for engine control has various kinds of starting tasks such as crank angle interrupt process, ignition pulse generating process, interval interrupt process and engine rotating speed capture process, each of which has individual requesting timing and serves with a rotating or time period corresponding to the individual requesting timing. Another application software program such as for AT control or ABS control is the same as above. As described above, the application software programs and the tasks therein each have various requested timings. The automatic sharing process function in the interface software program judges each of the various timings and automatically performs initialization for timer required for start-up Period setting of the micro-computer and allocation of vector addresses for process contents in the requesting timings.

Figure 22:
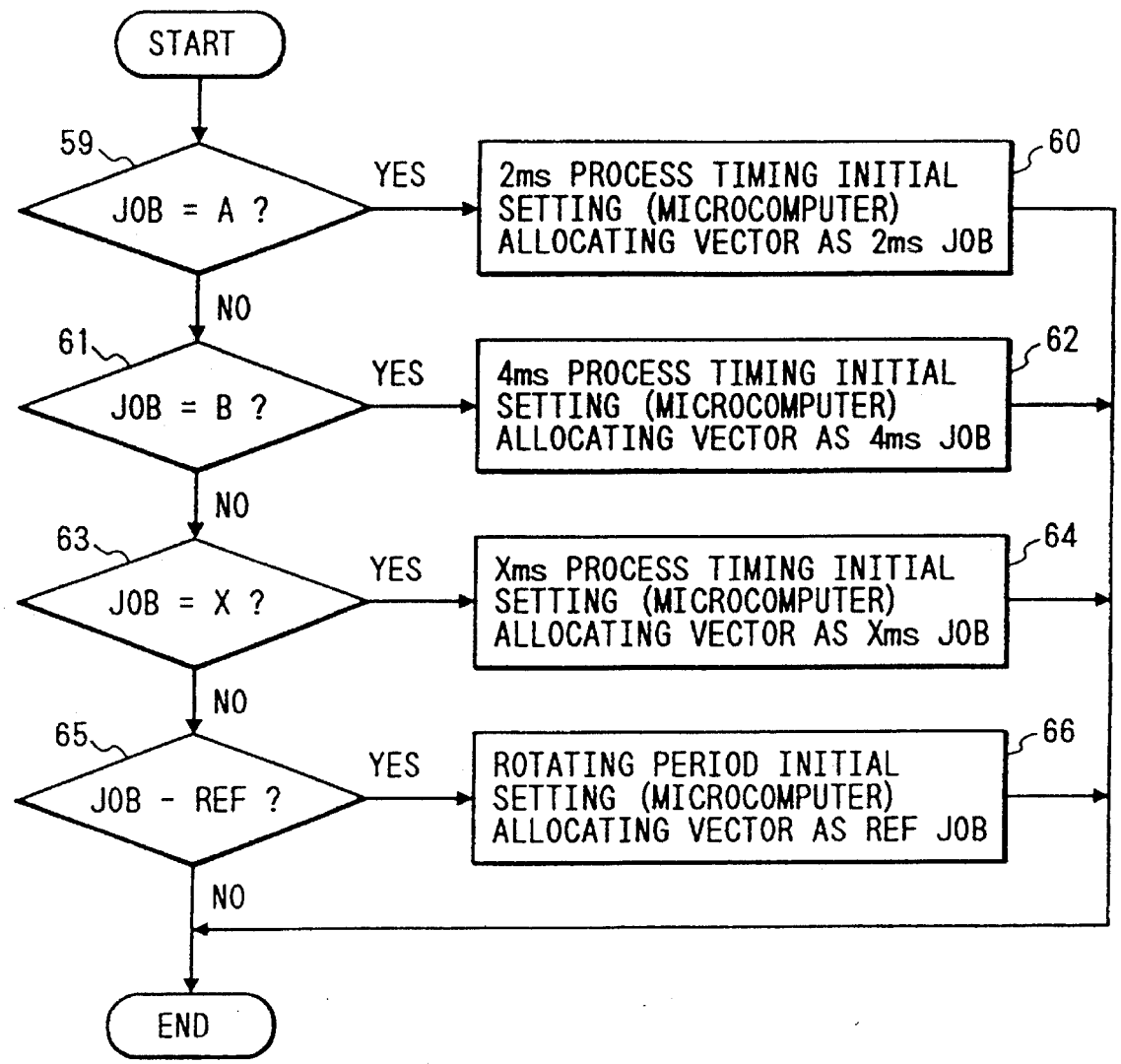
FIG. 22 is a detailed control flow chart for time shearing.

FIG. 22 is a control flow chart showing the details of FIG. 21. In a case where JOB=requiring timing as an example of a task starting timing description form in an application software program written in C language, a judging program is started at every starting of the task to judge what the content of JOB is. If JOB=A(59), the micro-computer is initialized in process timing of 2 ms cycle and, further, vector address allocation 60 is performed as process timing of 2 ms cycle. If JOB=B(61), the micro-computer is initialized in process timing of 4 ms cycle similar to the above and, further, vector address allocation 62 is performed as process timing of 4 ms cycle. If JOB=REF(65), the micro-computer is initialized in rotating cycle process and vector address for starting of task is allocated (66). If JOB=X(63), the initialization of micro-computer and the vector address allocation 64 are performed corresponding to a specified timing requested by a user, for example, 20 ms cycle. By means of giving such a function to the interface software program, a problem of time management and timing allocation arising when the vehicle control software program happens to transfer to C language description can be avoided.

Figure 23:
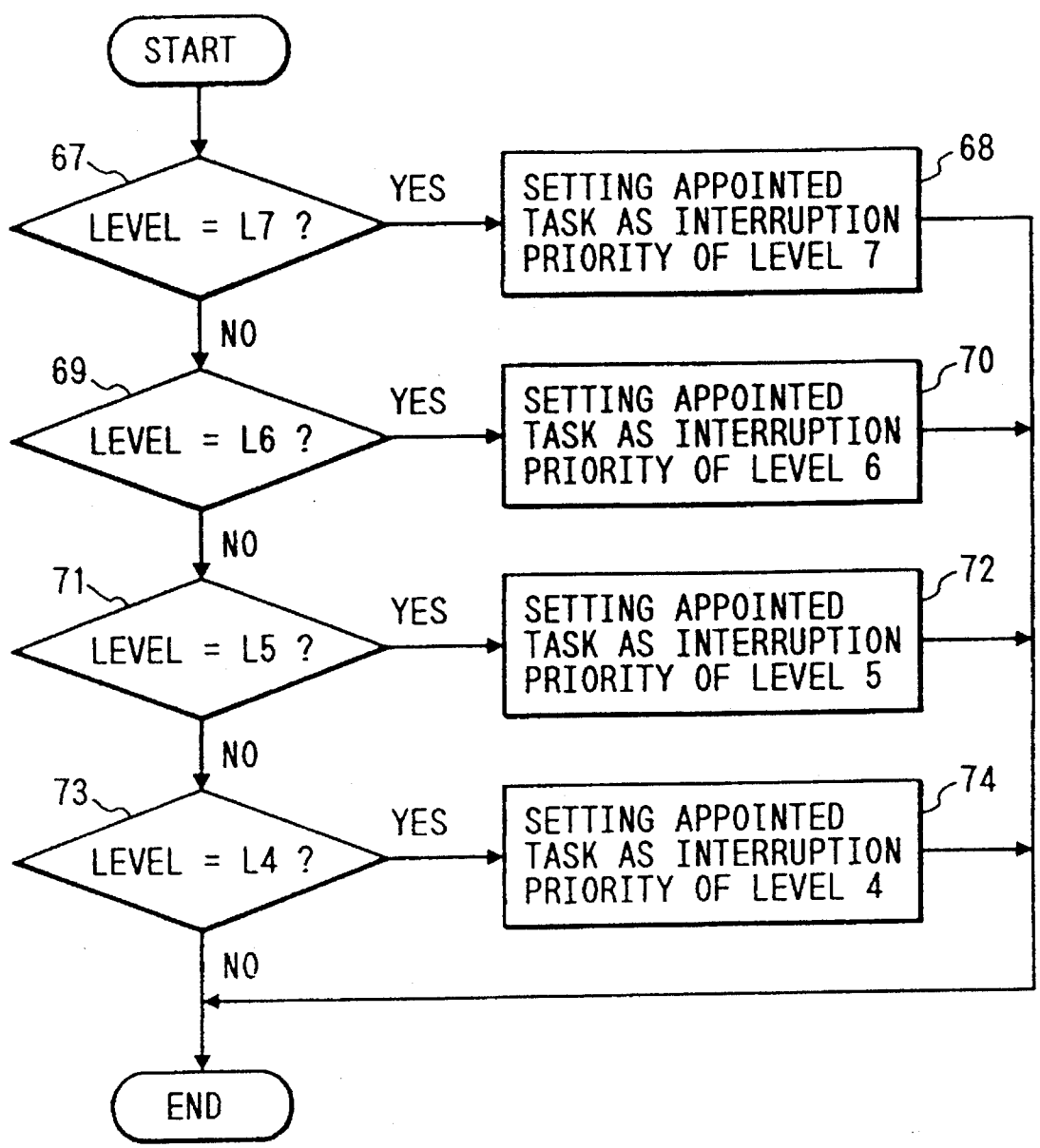
FIG. 23 is a flow chart of an interrupt level allocating program in the interface software program.

FIG. 23 is a flow chart of an interrupt level allocating program in the interface software program. The flow is basically the same as that of the time allocation. By judging what the label of the interrupt level requested from a started task in each of the control programs is, priorities are assigned to each of the tasks according to the labels to perform initialization of priority for the micro-computer. Step 67 determines whether the requested level is L7. If yes, priority setting 68 is executed with giving interrupt level of 7 to each of the corresponding JOB's. Similarly, by determining the requesting level at steps 69, 71 and 73, level settings (70, 72, 74) are executed, respectively. In each of the control application software programs in which a lot of tasks are started at individual timings, the interrupt level assigned to each of the tasks has an important role in a vehicle control which attaches importance to real timing. Employing the C language description turns an impossibility in describing the interrupt level into a possibility.

Table 1 below shows a specification of C language description for allocating timing and priority. Start timings of main tasks required for vehicle control are picked up and formed into specifications in advance, the timing and the priority required by a task being selected from the specification when each of the control software programs is developed. For example, when a task is of 2 ms cycle and of priority 7, a label of A, L7 is written in the front of the task. When a task is of 4 ms cycle and of priority 5, a label B, L5 is written. A plurality of labels for rotating cycle are also provided. Further, labels set by a user (a person who develops an application software program) are also be provided to set required timings freely. By doing this determination and allocation of initial values to a micro-computer by an interface software program can be performed without touching the application software programs. That is, only by modifying the interface software program, it makes it possible to cope with various micro-computers (CPU) with ease.

TABLE 1

| ITEM | LABEL | CONTENT |
|---|---|---|
| TIMING | A | setting 2ms JOB |
|  | B | setting 4ms JOB |
|  | X | setting Xms JOB (for user) |
|  | REF | setting rotating JOB |
| INTERRUPT | L7 | setting priority of level 7 |
| LEVEL | L6 | setting priority of level 6 |
|  | L5 | setting priority of level 5 |

Furthermore, allocation of input/output ports which is thought to be optimum to a corresponding micro-computer is performed as a processing function of the interface software program. In a case where the standard unit is used to perform vehicle control having different objects the input/output ports of the unit has a limitation in number and, on the other hand, four-cylinder control and six-cylinder control require input/output port allocation different from each other. Therefore, patterns for the optimum input/output allocation are set, a patten for input/output allocations being automatically selected by judging which type of control is intended to determine input/output signals to the micro-computer. Optimum input/output port allocations corresponding to control objects are formed in patterns to be stored.

Figure 24:
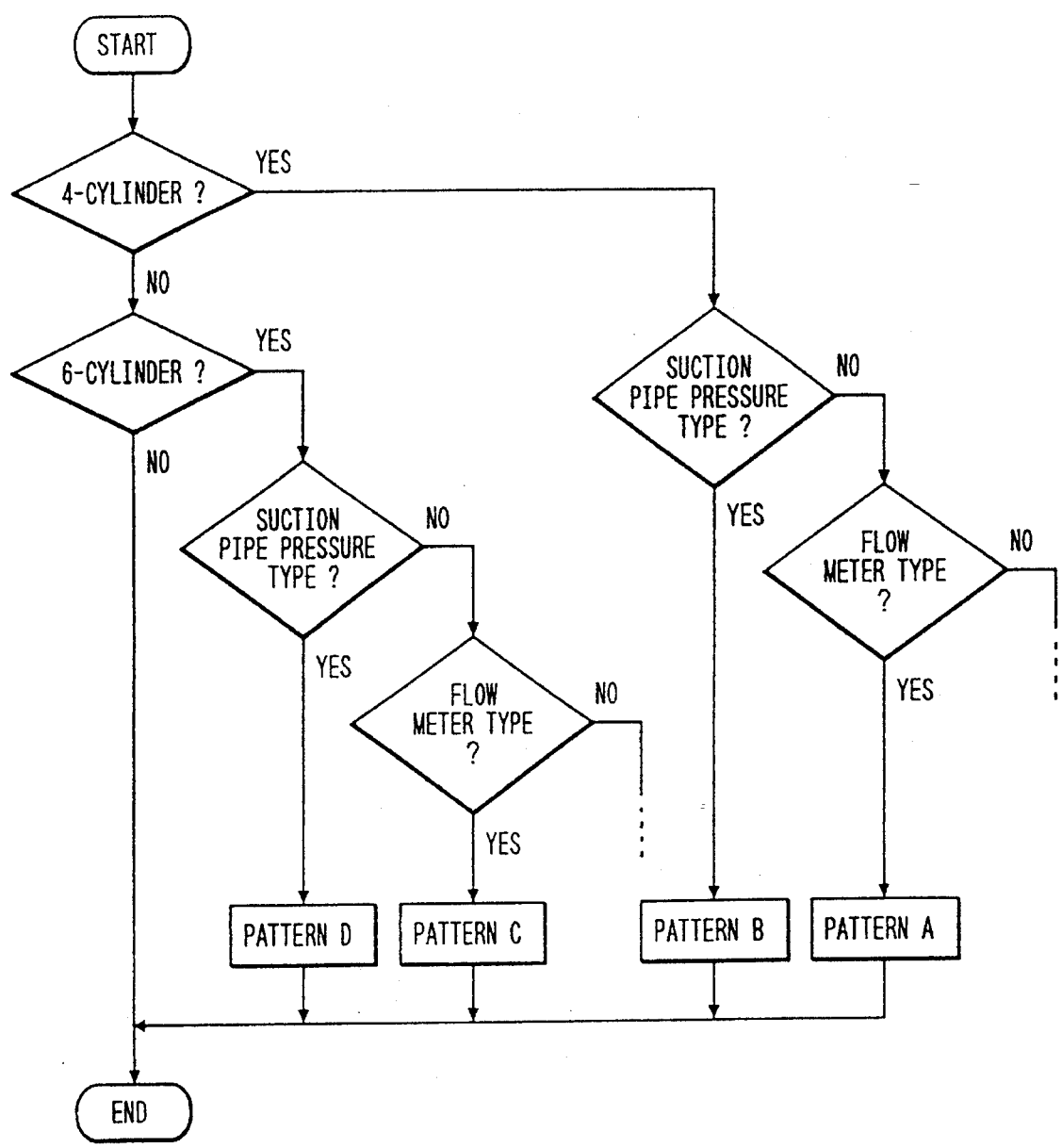
FIG. 24 is a flow chart of determining a pattern for an optimum input/output port allocation.

FIG. 24 is a flow chart for determining a pattern for an optimum input/output port allocation. If control object is a four-cycle engine control, the type of air flow measurement is judged in the next step. If it is an air flow meter type, pattern A is allocated. If it is a suction pipe pressure type, pattern B is allocated. In case of a six-cylinder engine control, pattern C or pattern D is allocated corresponding to the result upon judging the type of air flow measurement. Thus, by using a common unit and by forming patterns for allocation of a limited number of input/output ports, it can be realized automatically to determine an allocation corresponding to a control object.

Figure 25:
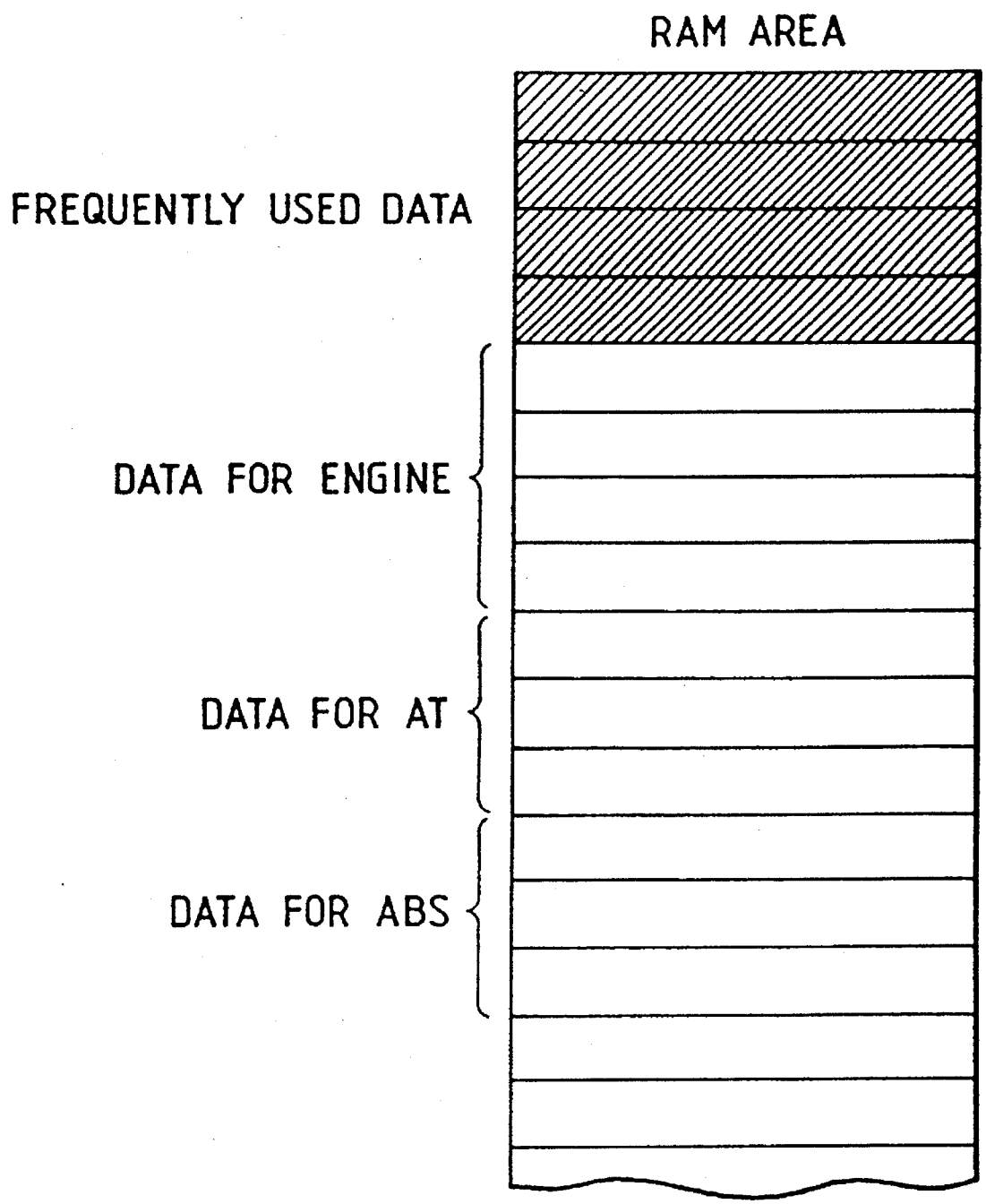
FIG. 25 is a diagram showing frequently used data grouping location in an area of a RAM.

FIG. 25 is a diagram showing frequently used data grouping locations in an area of a RAM. Although originally developed data for engine control, AT control and ABS control are stored in areas of the RAM, the data among them, which are used in more than two kinds of control and have high frequency of use, are located as a group as frequently used data. By doing so, the ROM capacity in the program can be decreased using a base register. When communication, that is, data supply is performed between control application software programs, it is convenient to locate the frequently used data in a group since data reference can be done in one block.

Figure 26:
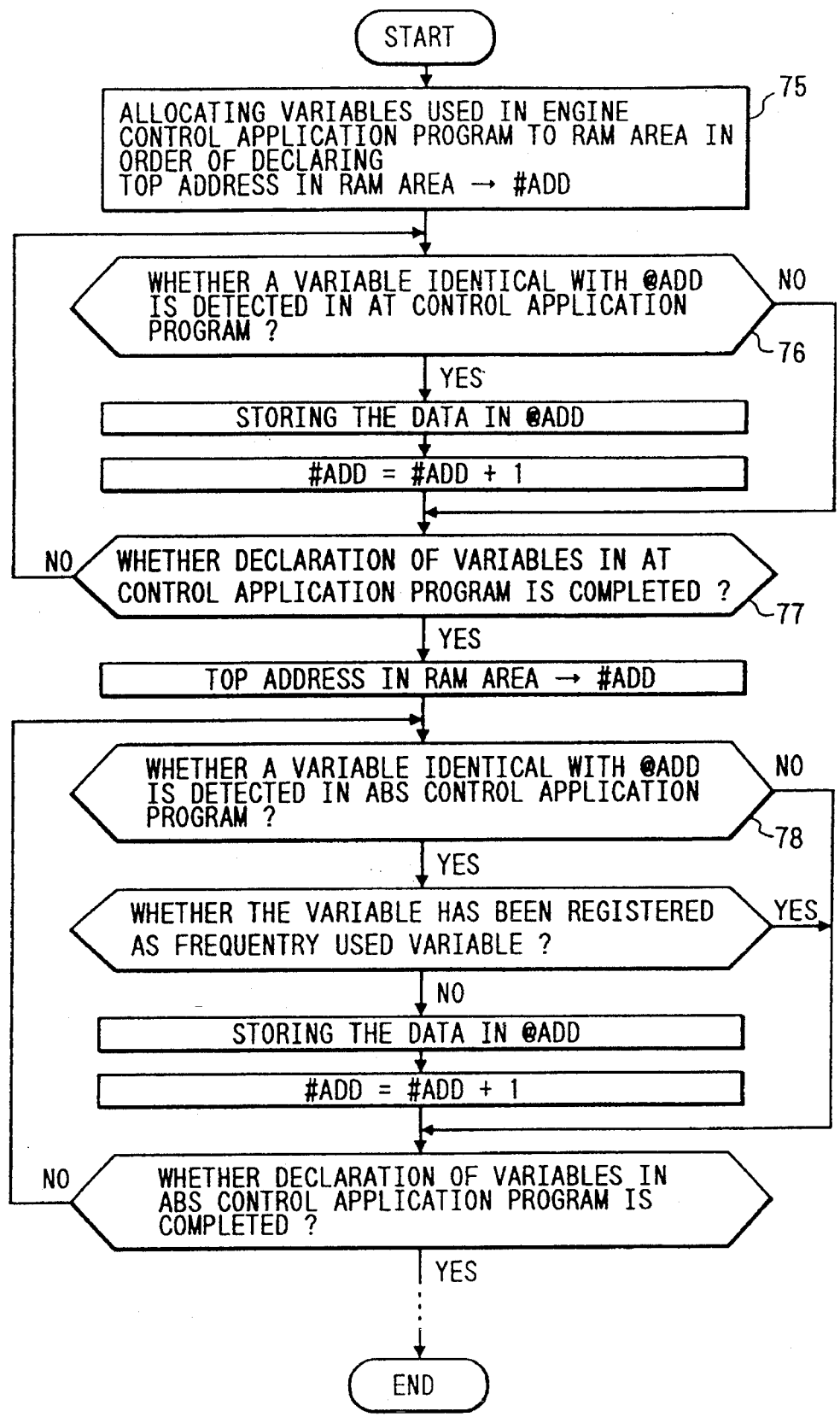
FIG. 26 is a flow chart for frequently used data grouping location.

Fig.26 is a flow chart of the frequently used data grouping location. The flow will be explained, referring to originally developed application software programs written in C language for engine control, AT control and ABS control. In FIG. 26, first, variables declared to be used in the engine control are allocated 75 in an area of the RAM in declared order. Therein, the top address of the frequently used data allocating area in the area of the RAM is put as #ADD, retrieving 76 is performed to find the variables identical with the engine control variables among the variables declared in the AT control. If the identical variables are found, the data are stored in the ADD address and the address ADD is incremented. All the declared variables in the AT control are repeated to compare with the engine control variables until completion.

After retrieving the AT control variables 77, retrieving 78 is performed to find the variables identical with the engine control variables and the AT control variables among the variables declared in the ABS control. If the identical variables are found, the data are stored in the ADD address and the address ADD is incremented. All the variables are repeated to compare with the engine control variables until completion as the sane as above.

With such a process, the frequently used data can be located in a group in an area of the RAM. Even viewing the engine control only, the engine control has many starting tasks, and in each of the tasks several used variables are declared. As described above, there is a possibility that many frequently used variables are contained in the other control program. By means of employing the similar simple flow construction, retrieval and grouping location of the frequently used variables between tasks in a control program as well as between control programs can be achieved.

Figure 27:
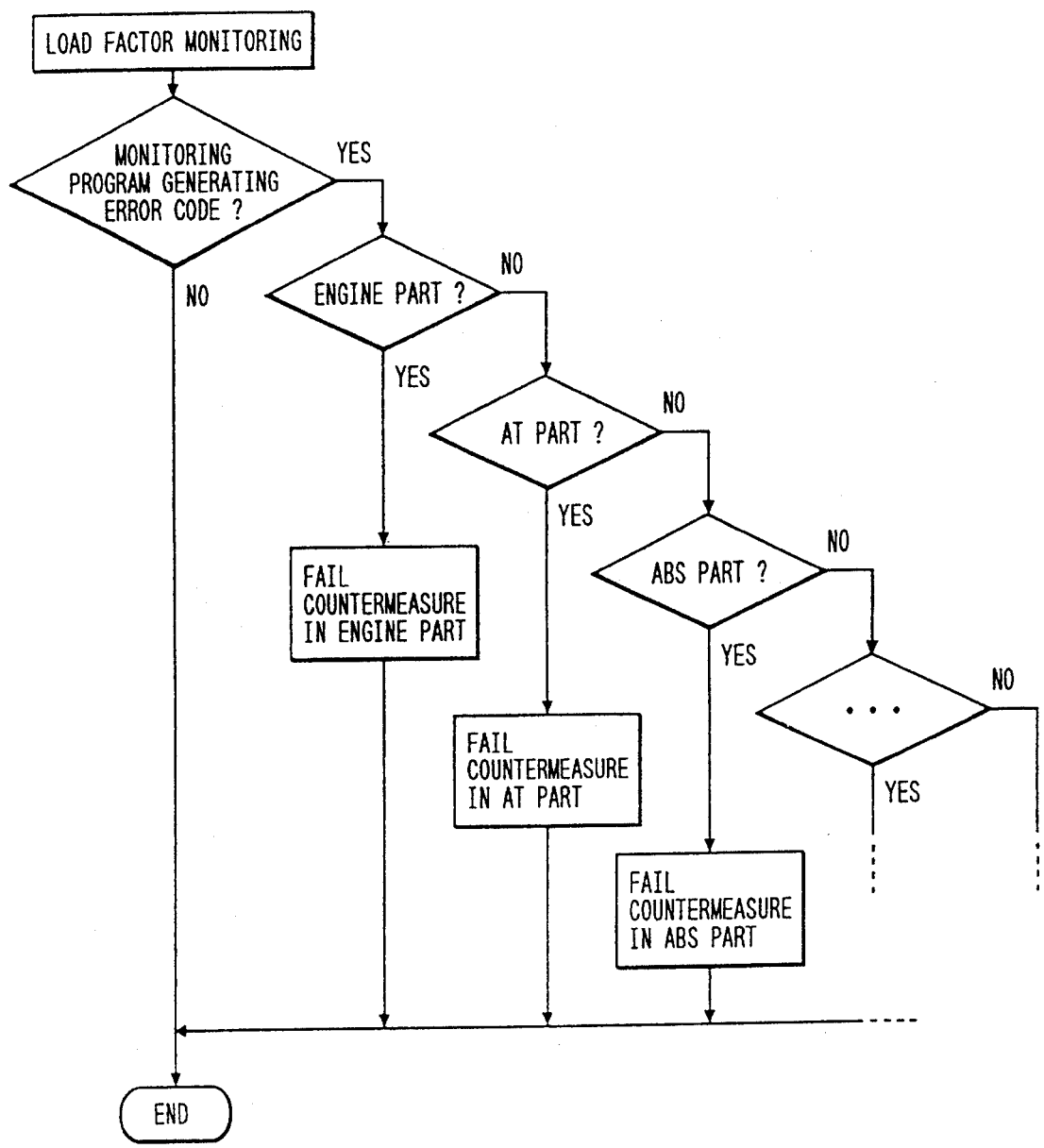
FIG. 27 is a simplified flow chart for detecting abnormal point using a monitoring program.

An embodiment of a monitoring program for detecting an abnormal control point will be described below. FIG. 27 is a simplified flow chart for detecting abnormal points using a monitoring program. In FIG. 27, special error codes are set in each of the control parts and each of the tasks for the vehicle control program. When an error code arises, the monitoring program judges by code identification in which part the error takes place, in the engine control part, in the AT control part or in the ABS control part, and starts a countermeasure for the failure set in each of the control parts to perform fail safe. By means of setting such error codes in each of the control parts and each of the tasks therein, when an integrated large application software program for vehicle control is debugged, it is possible easily to detect the bug by identifying the error code, that is, to detect in which control application software program and in which task the abnormality arises.

Further, each of the tasks in the individual application software programs originally developed under the interface software program has a flag operating program to set a starting flag at task starting time. And the interface software program has a monitoring program to monitor the starting flag set by the flag operating program with a constant cycle. The monitoring program performs the diagnosis of the CPU load factor, as well as, calculates and manages the processing time for each of the tasks. When the task processing is not completed within a prescribed processing time for each of the tasks set in the monitoring program, or when the task processing time exceeds a CPU load factor assigned to each of the control programs, a pre-set identifiable error code is put out to be utilized for a fail safe countermeasure or for a debugging process. As a method of detecting an abnormal point using the monitoring program, it is considered, for example, a fail safe software program method citing a software timer, a starting task monitoring program method obtained by expanding monitoring contents or a macro processing time monitor method using a watchdog timer.

In the fail safe software program method citing a software timer, for example, a plurality of tasks are located in the processing time monitoring task in higher priority order, a processing time monitoring timer for the task under processing being incremented, the timer data being compared with a prescribed processing time set in advance, an error code specifying each of the tasks being output when the data of the timer exceeds the prescribed time. Since the prescribed processing time is determined such as to be an integer number of times of the starting cycle of the monitoring program, the prescribed processing time can be set in any milli-seconds by varying the starting cycle.

In the starting task monitoring program method obtained by expanding monitoring contents, for example, each of control programs is contained in a single software program, the monitoring program being constructed such as to be capable of calculating and managing the processing time of the task under processing and monitoring the CPU load factor. The starting task monitoring program has a program for monitoring the CPU load factor by each of the control programs such as the engine control program, AT control program, a common control program and so on. The program counts each load of the control programs on the CPU, defining a load factor error as an over occupation of the CPU load factor such that an error arises when the CPU load factor of tasks (work) related to each control exceeds 70% of the total load, and diagnosing whether the value of the counter provided in each of the control parts exceeds 70. If there is an abnormality, the processing times are diagnosed starting from the task having higher priority in the control part where the abnormality arises, and an error code indicating the abnormal task is output. The CPU load factor may be known from the counter in each of the control parts, such as the engine, AT, common control parts even when no load factor error arises.

In the macro-processing time monitor method using a watchdog timer, for example, a monitoring program is started with the generation of a forced interrupt (NMI) by an over-flow when the watchdog timer is not cleared within an over-flow set time of the timer due to the occurrence of an abnormality in the processing, an error code indicating the task where the abnormality arises being output by means of comparing a stack pointer (SP) just before the occurrence of the abnormality with the address containing each of the programs. Although the watchdog timer method requires a rather small program size, the state of each of the tasks is monitored roughly as described above. However, the watchdog timer method has an advantage in that bugs hardly arise.

An embodiment of a list written in the interface software program will be described below.

Figure 28:
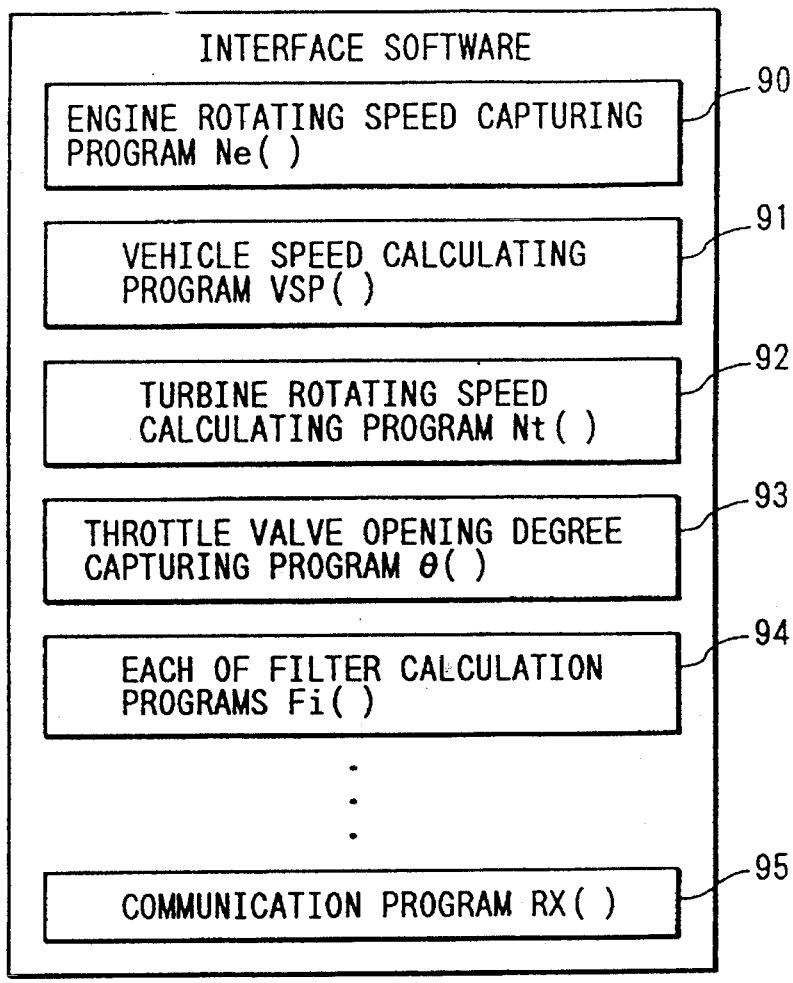
FIG. 28 is a block diagram showing turning basic processing programs into installed functions.

FIG. 28 is an embodiment of the construction showing turning basic processing programs into installed functions in the interface software program. An engine rotating speed capturing program 90, a vehicle speed calculating program 91, a turbine rotating speed capturing program 92, a throttle opening degree capturing program 93 and a calculating program 94 for each of filters used with various frequencies are turned into functions, and further, an installed software program 95 for communication such as for a LAN is also turned into a function to be installed in the interface software program.

Figure 29:
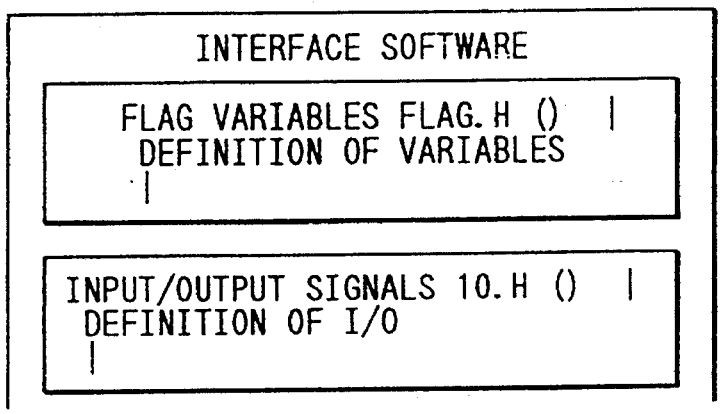
FIG. 29 is a block diagram showing turning definition and declaration of general vehicle control variables into functions.

FIG. 29 is an embodiment illustrating turning the definition and the declaration of general vehicle control variables into functions. A multiplicity of flag variables and I/O variables such as input/output signals are defined and declared in the interface software program to be turned into functions as header files. The flag variables are defined by taking the form declaration and the bit field into consideration such as to become an optimum C language.

Figure 30:
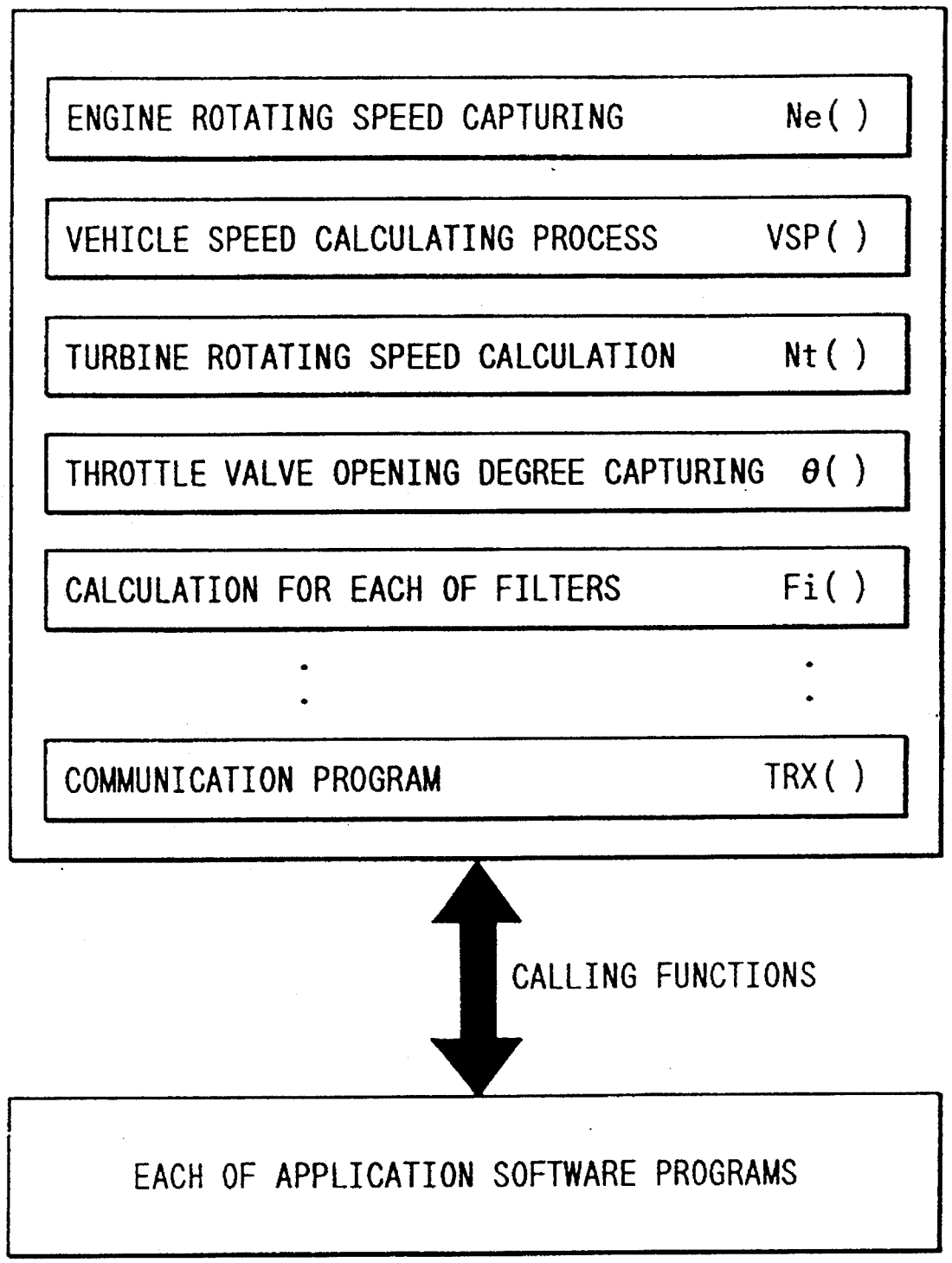
FIG. 30 is a block diagram showing the formulation of installed functions.

FIG. 30 shows an embodiment of the formulation of installed functions. By means of formulating the functions and including the formulation in the header file of the control software program developing side, the pre-defined variable can be used in constructing control software programs. And when a signal capture or a calculation originates in control processing, the required processing functions are invoked among the basic processing functions described above. By means of turning the basic process program into functions and formulating the I/O signals and the variables for common vehicle control as the functions in a header file, development of a vehicle control software program can be simplified. That is, by means of standardizing software programs by I/O processing and supplying the standardized material as a specification to the person responsible for developing an application software program (user), the user can add a sub-routine to, or change a necessary function of, the software program based on the specification to improve its function.

Figure 31:
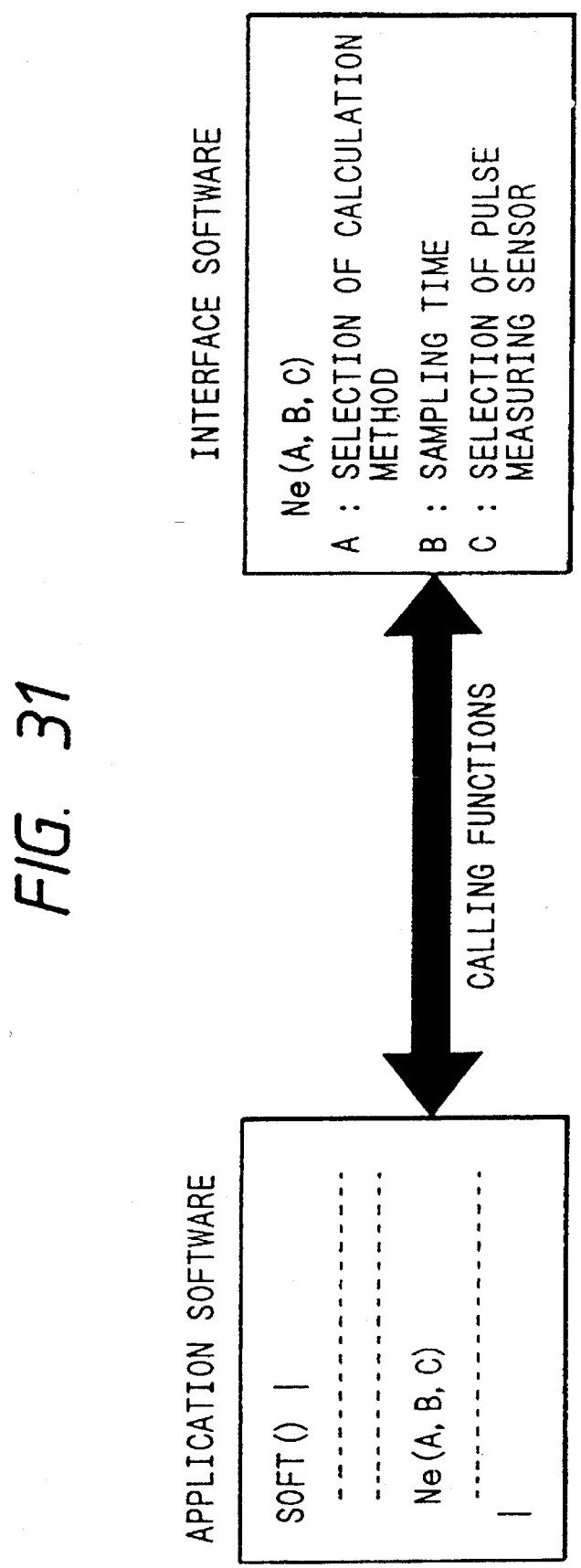
FIG. 31 is a block diagram showing means for selecting process function of the basic process functions.

FIG. 31 shows an embodiment of means for selecting a process function of the basic process functions. An example will be described below, wherein an argument is used for selecting the processing condition when the basic process functions are invoked from each of the application software programs for control. For example, an engine rotating speed capturing function includes a rotating speed calculating equation and a capture sampling time, and a pulse measuring sensor also includes various kinds of means. The interface software program is provided with programs corresponding to these means, so that a person responsible for development selects and describes the means by using an argument. Therewith, the requirement in the developing side is satisfied and the general versatility of the basic processing functions is improved. Similarly, by means of passing filter types, cut-off frequencies, degrees, and so on, to arguments in a filter calculation, a filter corresponding to these variables can be set.

Next, still another embodiment of the present invention will be described by way of example for a vehicle speed detection which is a part of the total control system for the vehicle, referring to FIG. 32 to FIG. 34.

Figure 32:
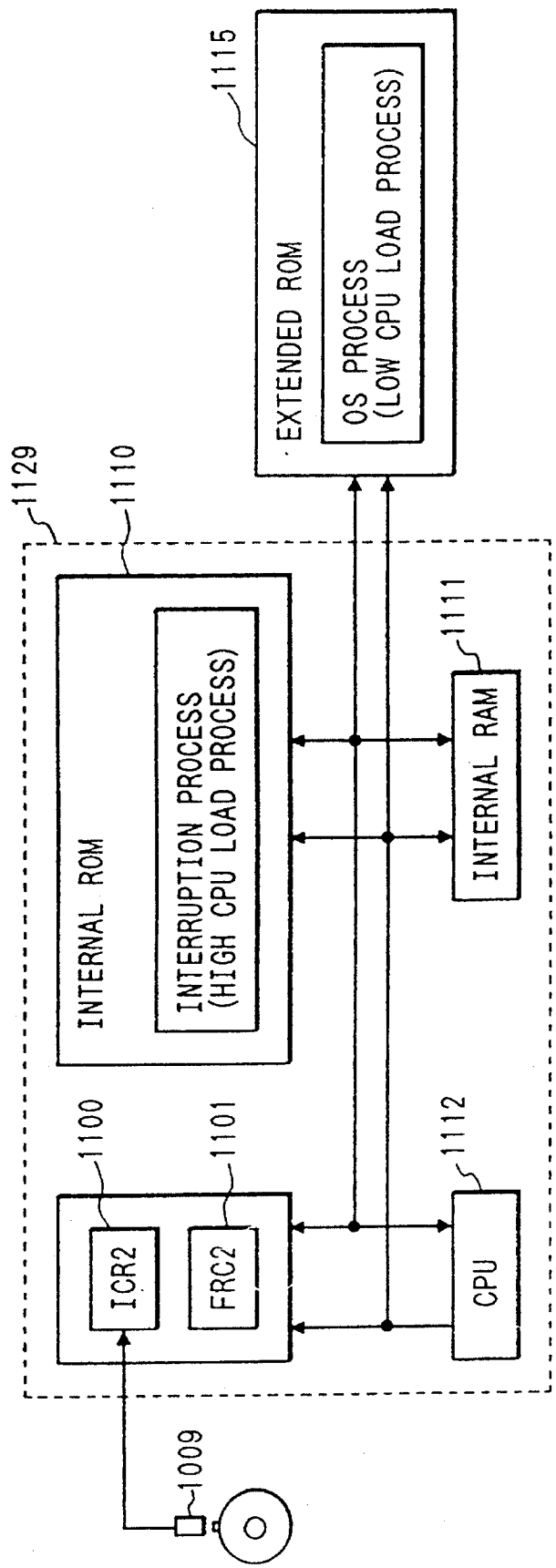
FIG. 32 is a block diagram showing a hardware construction used for a vehicle speed detecting system.

FIG. 32 is a block diagram showing a hardware construction used for a vehicle speed detecting system in an embodiment of a total control system in accordance with the present invention. A vehicle speed sensor 0 is a magnetic pick-up sensor used to detect the teeth of a gear or metallic projections attached on a drive shaft to obtain pulse signals having a frequency proportional to the speed of the vehicle. With a building-up of the signal, an input capture register (ICR2)

1100 contained in a microcomputer 1129 receives a value in a free running counter (FRC2) 1101 to generate an interrupt request against to a CPU 1112. The CPU 1112 performs a vehicle speed detecting program using an internal RAM 1111 and an internal ROM 1110 or an extended ROM 1115. Therein, the input capture register 1100, the free running counter 1101, the CPU 1112, the internal RAM 1111 and the internal ROM 1110 are constructed as an on-chip structure, so that the access speed of the CPU 1112 to the internal ROM 1110 is higher than the access speed to the extended ROM 1115. Therefore, the internal ROM 1110 stores the interrupt process program having a high CPU load factor, and the extended ROM 1115 stores the programs having low CPU load factors such as an operating system (hereinafter referred to as "OS"). By doing so, the processing efficiency of the CPU 1112 can be improved.

Figure 33:
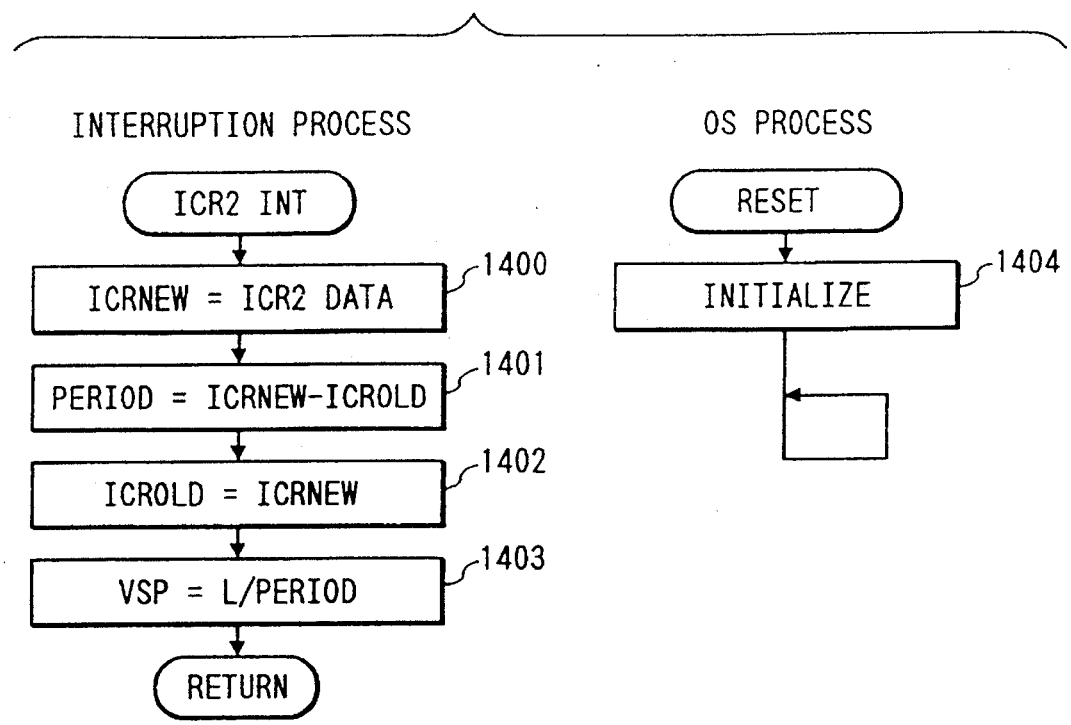
FIG. 33 is a flow chart showing a vehicle speed detecting process.

FIG. 33 is a flow chart showing a vehicle speed detecting process. The interrupt processing is started at the building-up edge of a vehicle speed pulse signal. In process 1400, a value in the input capture register 1100 is captured in INRNEW. Then, the period between building-up edges of the vehicle speed pulses PERIOD is calculated by subtracting ICROLD (ICRNEW at one precedent cycle) from ICRNEW. Process 1402 is to store ICRNEW now in ICROLD for the next cycle calculation. In process 1403, a vehicle speed VSP is obtained by dividing a vehicle speed conversion coefficient by the period of vehicle speed pulse PRERIOD. Since the vehicle speed pulse cycle becomes short as the speed of the vehicle increases, the frequency of occurrence of the interrupt request increases in the processes described above and consequently the CPU load factor increases. Therefore, it is preferable to decrease the CPU load factor by storing the interrupt processing program in the internal ROM 1110. On the other hand, the OS process performs initializing process 1404 such as mode setting and clearing of the RAM, and then becomes a endless loop. However, a task dispatcher is generally provided in a part of the endless loop to perform the processes having low real-time demand such as man-machine interface processes. Therefore, the OS process has a low CPU load factor and can be performed using the extended ROM 1115.

Figure 34:
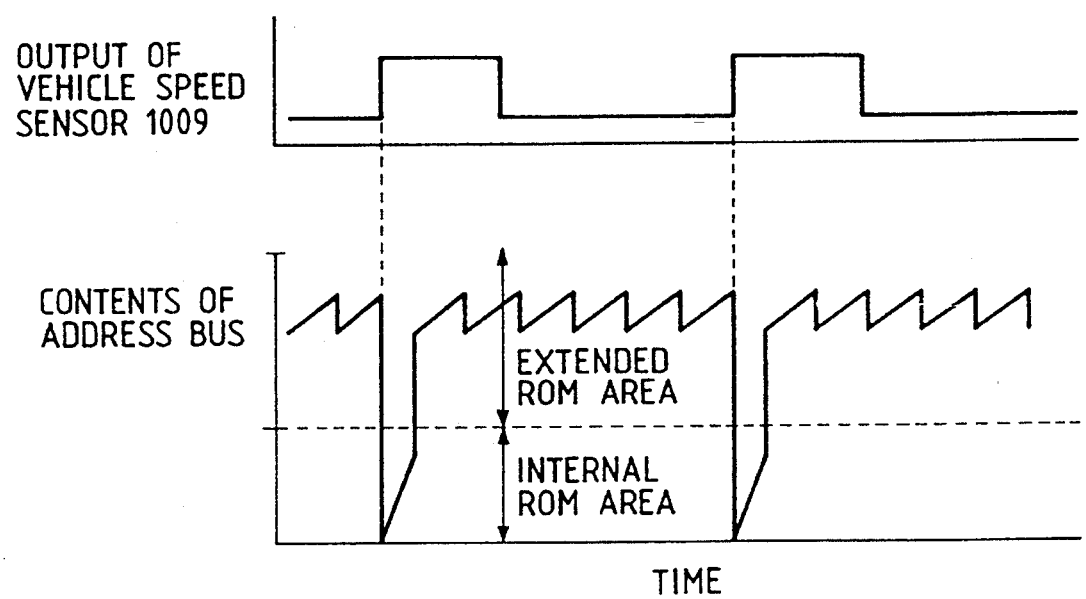
FIG. 34 is a block diagram showing the hardware construction of a vehicle speed detecting system in an embodiment of a total control system in accordance with the present invention.

FIG. 34 shows how the contents of the address bus in the extended ROM 1115 changes depending on the signal of the vehicle speed sensor 1009. Although the address bus indicates an address in the area of the extended ROM such as the OS process in the normal condition, it can be observed to change the address in the internal ROM to perform interrupt processing at building-up of the signal from the vehicle speed sensor 1009.

The other embodiment will be described below, referring to FIG. 35 to FIG. 45.

Figure 35:
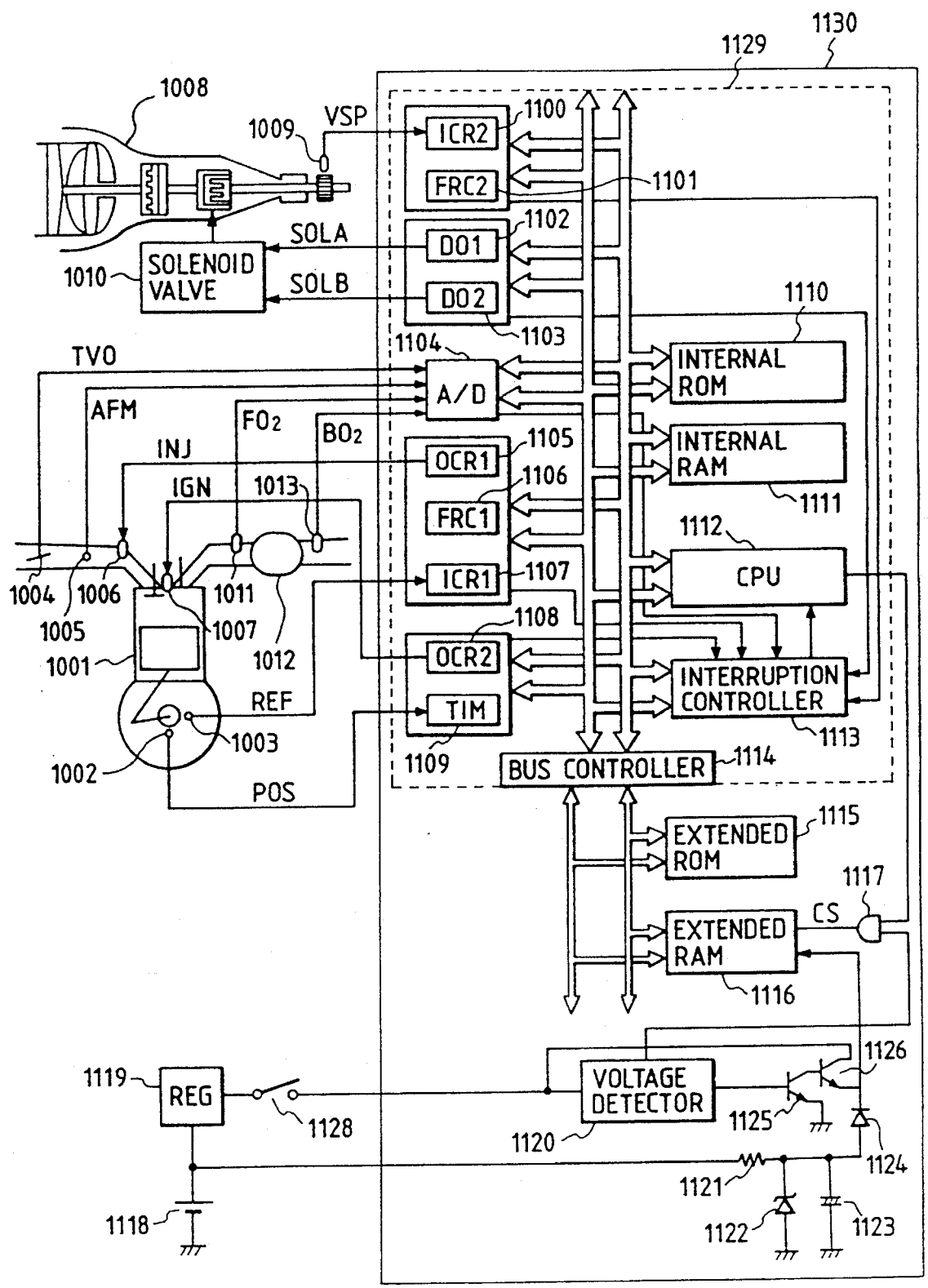
FIG. 35 is a flow chart showing detecting process.

FIG. 35 is a block diagram showing the basic hardware construction of another embodiment of a total control system for a vehicle in accordance with the present invention. The controlled objects in this embodiment are a six-cylinder four cycle engine 1001 and a four step automatic transmission unit 1008. The deterioration diagnosis of a catalyst 1012 and an on-board self diagnosis such as miss-fire detection are performed. These are controlled by the control system for vehicle 1130 using a one-chip microcomputer 1129 having an internal ROM 1110 or an internal RAM 1111.

First, the process procedure of signals concerning the engine 1001 will be described. Signal REF is obtained from a cylinder discriminating sensor 1003 which outputs six pulses in two rotations in the case of a six-cylinder four-cycle engine. The widths of the pulses differ depending on the cylinders and this information is used for the discrimination of cylinders. The signal POS is obtained from a position sensor 1002 which outputs a pulse every 2 degrees of crank angle. Since the signal is used as a clock input signal to a timer 1109, the timer counts up the signal corresponding to the rotation of the engine. Therefore, the counted value indicates the crank angle and can be used as a standard for fuel injection and ignition control. Although the block diagram in the embodiment shows a case where the crank rotating angle is employed as a standard, it is possible to perform control by means of employing the standard time obtained from a free run counter having input of a constant period clock signal. In other words, it is possible that a target angle is divided by the engine rotating speed to be converted into a time dimension and used for control.

On the other hand, there is data which is required to be stored. For example, an air/fuel ratio is preformed feedback control using oxygen sensors 1011 and 1013 such as to become 14.7 at a normal operation. The difference between the fuel injection rate in this time and a calculated base fuel injection rate is stored as a learned correction amount so that the injection time can be instantaneously corrected when an operating state is known. Therefore, the value has to be stored in a RAM to which electric power is always supplied even when the vehicle is being stopped. In order to realize this, for a case of requiring the back-up, voltage detecting means 1120 is provided to detect lowering of the voltage supplied to the RAM and supply a constant voltage obtained from a resistance 1121 for current restriction, a Zener diode 1122 for obtaining a constant voltage, a capacitor 1123 and a diode 1124 for preventing inverse current flow. The circuit is independent from a power source switch IGNSW 1128 and is always supplied with power from a battery 1118.

On the other hand, when the normal power is supplied to the circuit, the base voltage of transistors 1125 and 1126 is lowered to the ground level to shunt between the collector and the emitter and supply the constant voltage obtained from a regulator 1119 to an extended RAM 1116. In order to bring the extended RAM 1116 into the back-up mode, the extended RAM has to be brought in a non-selected state. Therefore, the chip-select signal from the CPU 1112 can be prohibited by using an and gate 1117.

Figure 36:
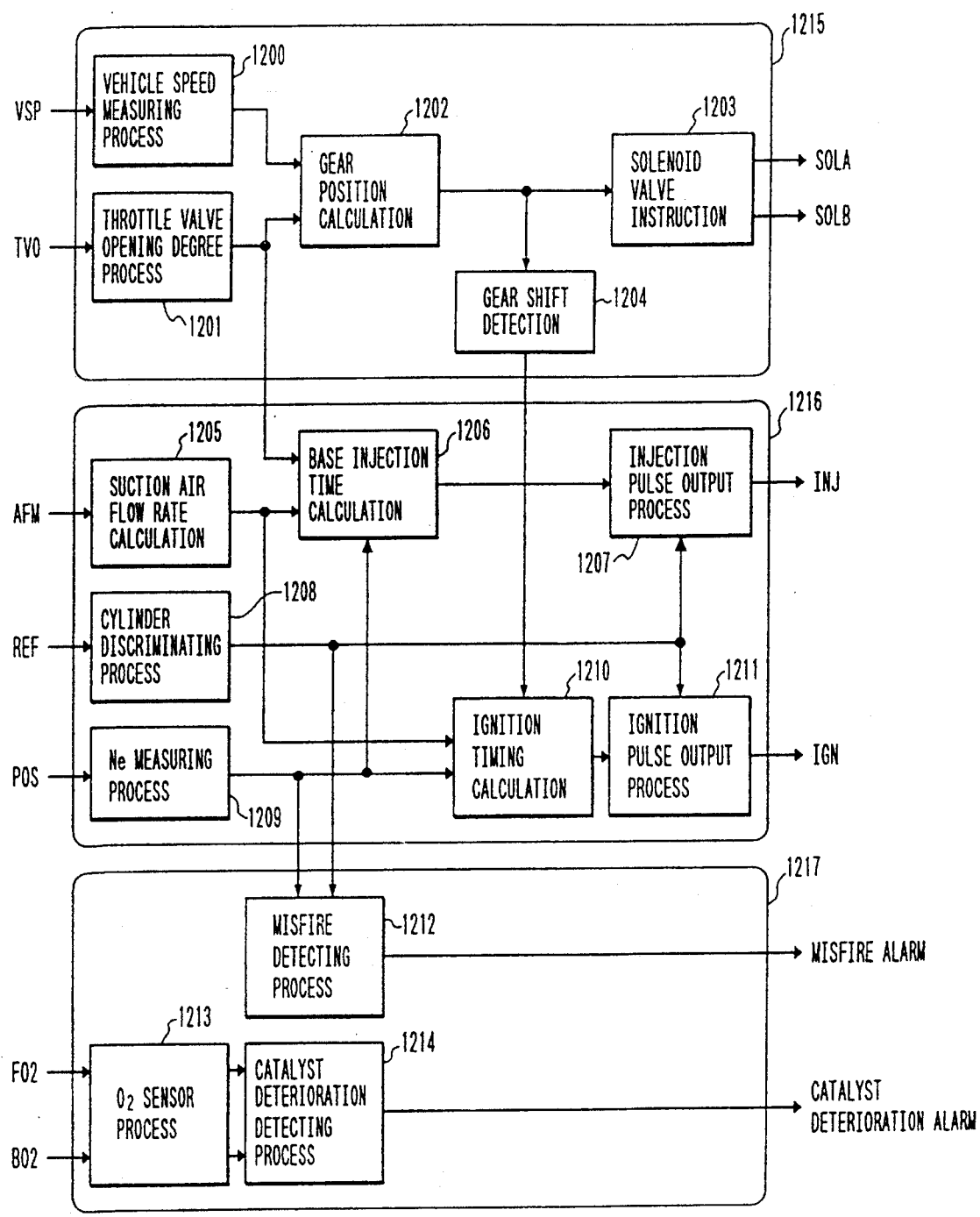
FIG. 36 is a chart showing the relationship between contents of address bus and an interrupt request.

FIG. 36 is a control block diagram according to the present invention. The engine 1001 is controlled mainly by a block 1216, the automatic transmission unit 1008 by a block 1215, the on-board self-diagnosis by a block 1217.

First, the engine control block 1216 will be described.

In block 1209, an engine rotating speed Ne is calculated by means of measuring the pulse cycle or counting the number of pulses in a certain time duration using the pulse signal synchronizing with the engine rotation obtained from the position sensor 1002. Further, in block 1205, the signal from an air flow rate sensor 1005 is treated with a coefficient conversing process to obtain a suction air flow rate Qa. In block 1206, a base fuel injection rate Ti is calculated using these values based on the following equation.

$$Ti = K \cdot \{Qa/Ne\} + Ts, \qquad (1)$$

where

K: correction coefficient

Ts: inoperable pulse width.

The base fuel injection rate Ti is treated with the process in block 1207 using the cylinder discrimination signal obtained in block 1208 to be output as an injection pulse to an assigned cylinder. The pulse width of ignition the ignition timing are determined in block signal and 1210 using the suction air flow rate obtained in block 1205 and the engine rotating speed Ne obtained in block 1209. These values are obtained through retrieving data tables being pre-set. However, it is preferable that the shock caused by gear shift is moderated by means of decreasing the output torque when the automatic transmission unit 1008 shifts. Therefore, when the torque decreasing instruction from block 1204 is received, the ignition timing is shifted at the same time approximately degrees behind to decrease the output torque. In block 1211, the pulse width of the ignition signal and the ignition timing are treated with the process in block 1211 using the cylinder discrimination signal obtained in block 1208 to be output as an injection pulse to an assigned cylinder.

Figure 37:
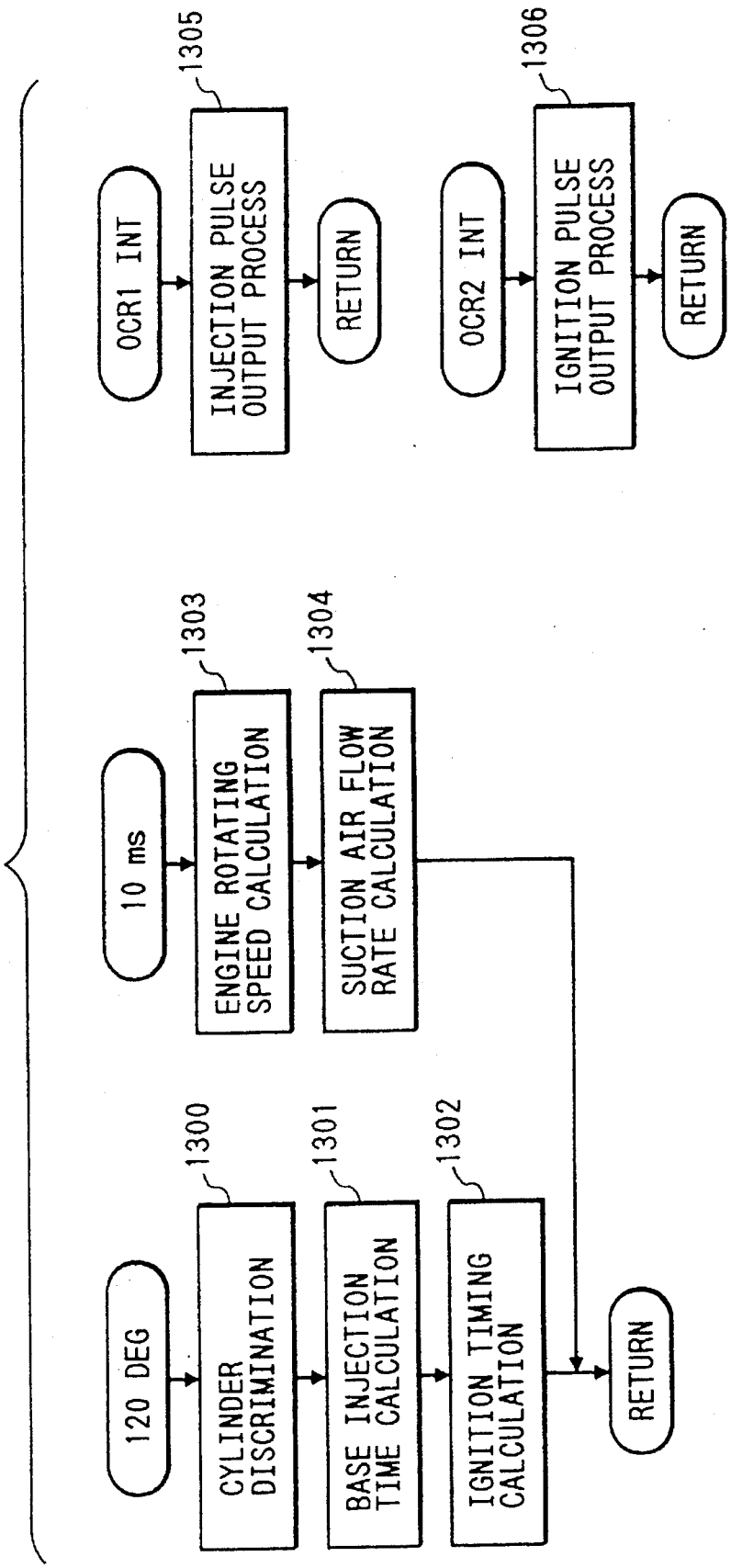
FIG. 37 is a block diagram showing the basic hardware construction of another embodiment of a total control system in accordance with the present invention.

FIG. 37 is a flow chart showing an engine control process. Since cylinder discriminating process 1300, base injection time calculation 1301 and ignition timing calculation 1302 are processes necessary for injection or ignition for each of the cylinders, the processes are started at the building-up edge of the cylinder discrimination signal REF. That is, in a six-cylinder four-cycle engine, the processes are started every crank angle of 120 degree. On the other hand, engine rotating speed calculation 1303 and suction air flow rate calculation 1304 are started with the cycle of 10 ms. Both the injection pulse output process 1305 and the ignition pulse output process 1306, which execute actual output pulse processes, are started by an interrupt generated when the value of an output comparator register and the value of the free running counter agree.

Figure 38:
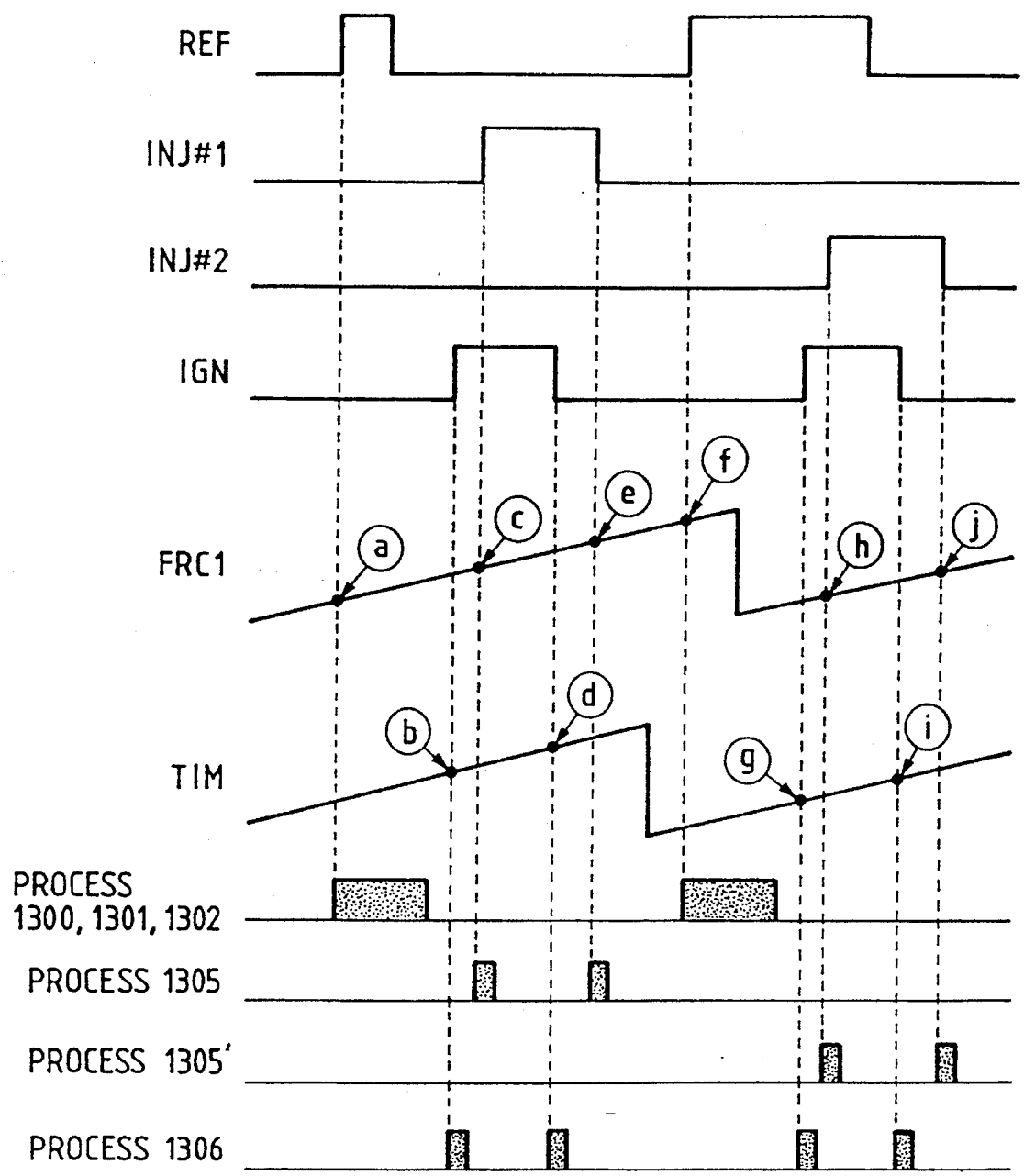
FIG. 38 is a control block diagram.
Figures 39, 40:
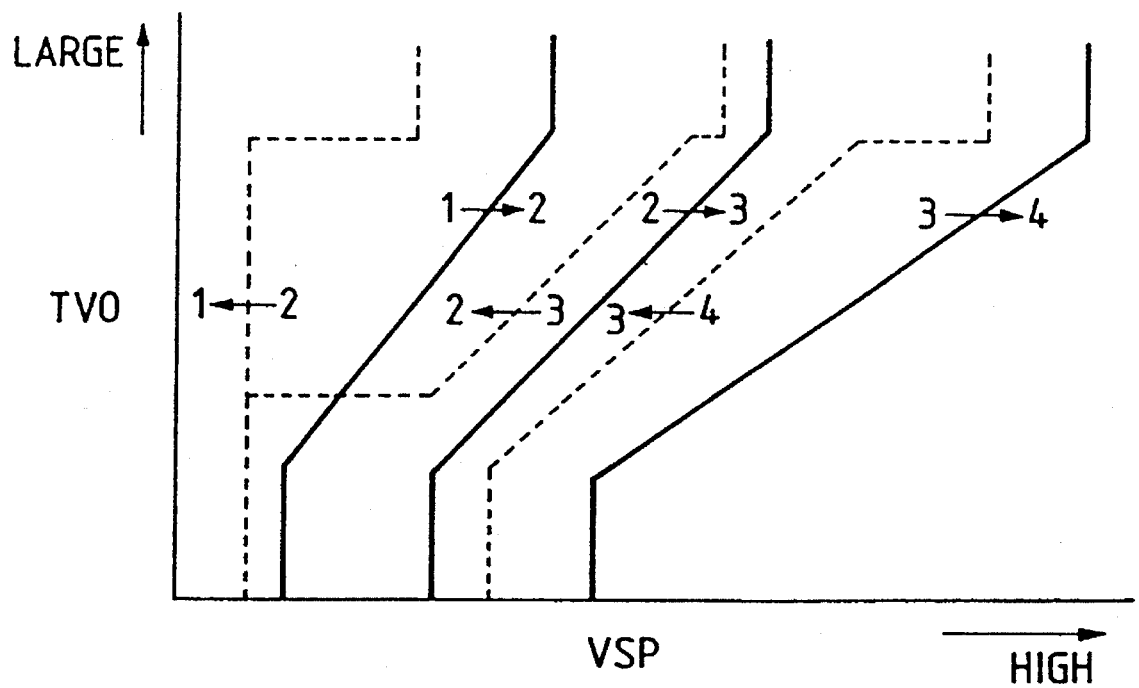
FIG. 39 is a flow chart showing an engine control process.
FIG. 40 is a time chart showing an engine control process.

The above operation will be described, referring to a timing diagram. FIG. 38 is a timing diagram of the control signals during operation of an engine. At point (a), the value of the free running counter 1106 is entered into the input capture register 1107 with the building-up or leading edge of the cylinder discrimination signal REF to calculate an engine rotating speed Ne based on the value. The analog signal from the air flow rate sensor 1005 is also captured through an A/D converter 1104 to calculate a suction air flow rate Qa. Using these values, a fuel injection rate Ti, required for generating a fuel injection signal, is calculated according to Equation (1). Further, a pulse width of the ignition signal and an ignition timing required for generating an injection timing and an ignition signal are obtained through retrieval of a pre-set table using the suction air flow rate Qa detected by the air flow rate sensor 1005 and the engine rotating speed Ne. By using the values calculated in such a manner, the building-up position of the fuel injection signal INJ is set in the output comparator register 1105, and the building-up or leading position of ignition signal IGN being set in the output comparator register 1108. That is, the process 1300, the process 1301 and the process 1302 are executed in the interrupt at the point (a). At point (b) when the value of the output comparator register 1108 and the value of the timer 1109 agree, the ignition signal IGN is built up and the falling position of the signal is concurrently set in the output comparator register 1108. At point (c) when the value of the output comparator register 1105 and the value of the free running counter 1106 agree, the fuel injection signal INJ#1 built up and the falling position or trailing edge of the signal is concurrently set in the output comparator register 1105. At point (d), the ignition signal IGN falls according to the falling-set at the point (b). At point (e), the fuel injection signal INJ#1 falls according to the falling-set at the point (c). At the point (f), the engine rotating speed Ne, the fuel injection rate, the pulse width of ignition signal and so on are calculated in the same way as at point (a). Although setting of the building-up or leading edge of the fuel injection signal INJ is not illustrated in FIG. 4, the pulse for a second cylinder is output. And the others are the same as the above (for example, the operation at point (g) is the same as that at point (b), the operation at point (h) being the same as that at point (c), the operation at point (i) being the same as that at point (d), and the operation at point (j) being the same as that at point (e)).

Especially at point (a) and point (f) among the above processes, it can be understood that the load on the CPU is large since a lot of calculations and table retrievals are performed. Such interrupt processes are indispensable for real-time control. When the CPU load factor for the processes exceeds 100%, the engine control becomes impossible. For example, when a six-cylinder engine is rotating at the speed of 6000 rpm, the cycle of the interrupt becomes 3.3 ms. During this interval, the calculations of fuel injection rate, ignition timing and so on described above have to be completed.

The control method for the automatic transmission unit 1008 will be described below.

In FIG. 35, a pulse signal having the frequency proportional to the vehicle speed is obtained from a vehicle speed sensor 1009. At the building-up or leading edge of the pulse signal, the value of the free running counter 1101 is captured in the input capture register 1100, and converted into a vehicle speed by the CPU 1112 based on the information. A gear shifting signal is output from digital port outputs 1102 and 1103 to control the hydraulic pressure to the transmission unit using a solenoid valve 1010.

In the control block 1215 for the automatic transmission unit shown in FIG. 36, in block 1200, by means of a measuring cycle of or a counting number of pulses within a certain time duration of the pulse signal from the vehicle speed sensor 9, vehicle speed information is detected to convert it into a vehicle speed VSP. An opening degree signal TVO of the throttle valve 1004 is converted into an angle signal in block 1201. Using this information, a gear position is determined in block 1202. These are performed according to the gear shift schedule shown in FIG. 39. That is, the vehicle speed VSP and the throttle valve opening degree TVO now are applied to the gear shift schedule under a constant period (for example, 40 ms) and the gear is shifted to the gear position indicated by the corresponding region. However, shift-down and shift-up take different schedule lines from each other, and hysteresis is given to them to avoid frequent gear shifting. Further, decreasing engine power at gear shifting can moderate the shock due to the gear shifting. Since the gear position instruction is changed at gear shifting, as described above in block 1204, the change in gear shifting is detected to output a power torque down instruction to the engine control. In block 1203, the gear position obtained is put in digital outputs 1102 and 1103 to be output. The gear position is output based on the relationship between the gear position and the gear shift signal output SOLA and SOLB shown in FIG. 40. incidentally, the automatic transmission unit 1008 is constructed such as to shift the gear position based on the gear shift signal, although this is not shown in the figure.

Figure 41:
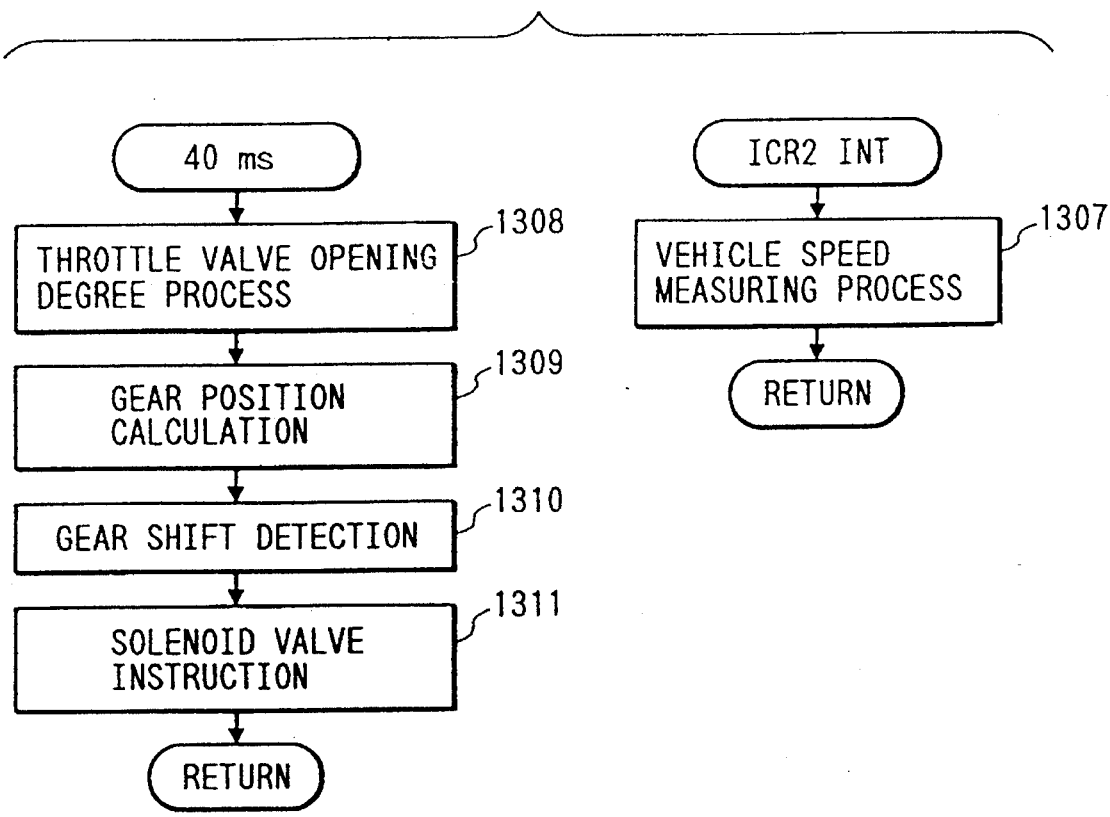
FIG. 41 is a graph showing gear shift schedule lines.

FIG. 41 is a flow chart showing the automatic transmission unit control process. In case of an automatic transmission unit, there is no process to be started at a special timing since there is no process that must be performed in synchronizing to the movement of each of the mechanisms. Furthermore, since the inertia of the whole vehicle is extremely large, the response speed of the control is not required to be especially fast. Therefore, the whole process is started with a comparatively slow timing (for example, 40 ms), and the calculation load on the CPU is comparatively small.

The on-board self-diagnosis will be described below.

The deterioration of the catalyst and the misfire of the engine will be described below as the diagnosed objects. As shown in FIG. 35, the diagnosis for the deterioration of the catalyst is performed by providing an $O_2$ sensor 1011 in the suction side of a catalyst 1012 and an $O_2$ sensor 1013 in the exhaust side, and judging that the catalyst 1012 has been deteriorated when the correlation between both signals becomes strong. On the other hand, the detection of engine misfire is performed by detecting a decrease in speed caused by a decrease in engine the engine rotating output torque due to misfire using the cylinder discrimination sensor 1003 and the position sensor 1002.

Figure 42:
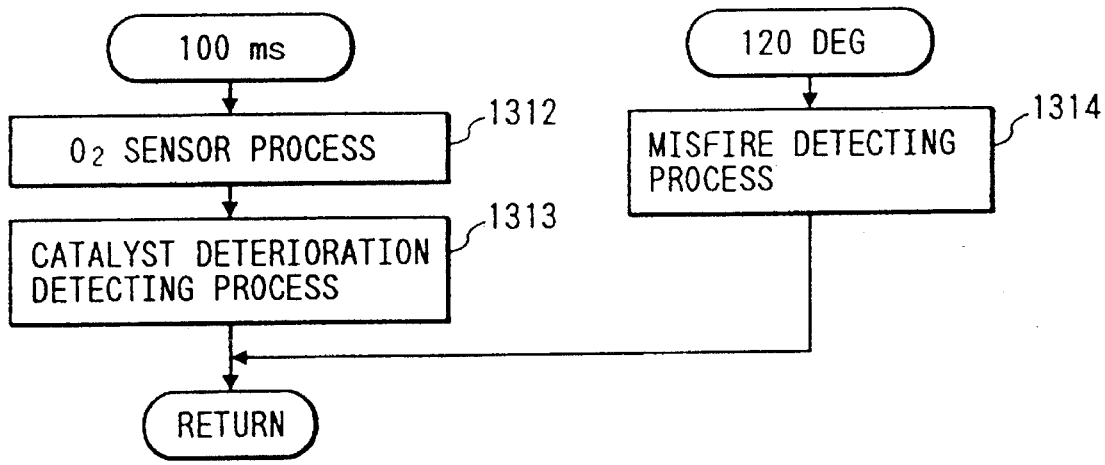
FIG. 42 is a diagram showing the relationship between gear position and solenoid valve instruction.

FIG. 42 is a flow chart showing an on-board self diagnosis process in this embodiment. Concerning the diagnosis for deterioration of the catalyst, first, a detecting process on the $O_2$ sensors 1011 and 1013 is performed in process 1312. Therein, the sensor signal is treated with processes such as digital low pass filtering or weighted mean calculating to decrease its noise. Then in process 1313, the catalyst deterioration detecting process is performed. In this process, the following calculating process is performed, wherein the output signal from the $O_2$ sensor 11 is set as $FO_2$, and the output signal from the $O_2$ sensor 13 is set as $BO_2$.

$$\phi a = \int FO_2(t) \cdot BO_2(t-\tau) dt, \qquad (2)$$

where $\tau$ is the time required by the exhaust gas to pass through the catalyst, $$\phi b = \int FO_2(t) \cdot FO_2(t) dt, \qquad (3)$$

$$X = \text{Max}\{\phi a/\phi b\} \qquad (4)$$

Therein, Equation (2) is the mutual correlation function of the sensor signals in the front and the back of the catalyst, Equation (3) being the self correlation function of the sensor signal in front of the catalyst. The catalyst deterioration index X is the ratio of Equation (2) to Equation (3) as indicated by Equation (4) to be used for the judgement. Therefore, the nearer to one the catalyst deterioration index X is, the more the deterioration progresses.

Figure 43:
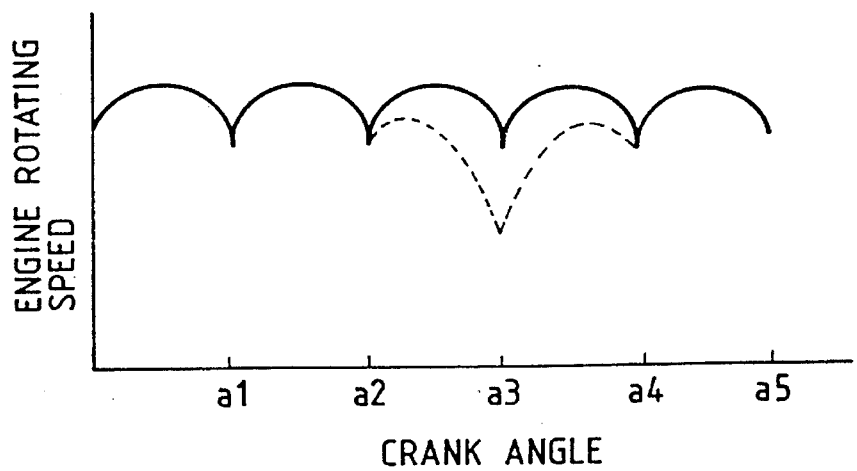
FIG. 43 is a flow chart showing an automatic transmission unit control process.

The detection of engine misfire is performed by detecting a decrease in the engine rotating speed caused by a decrease in the engine output torque due to misfire. In case of a six-cylinder four-cycle engine, the engine rotating speed is detected every crank angle of 120 degrees. Therefore, the start timing of the process 1314 is every crank angle of 120 degrees. FIG. 43 shows the engine rotating speed against the crank angle. In this figure, when the ignition is performed in normal at the crank angle of a3, the engine rotating speed will trace to the locus indicated by the solid line. However, when misfire occurs, the engine rotating speed will trace to the locus indicated by the dotted line. Therefore, in process 1314, an abnormal fall in engine rotating speed is detected.

The data bus structure between the microcomputer 1129 and the extended ROM 1115 or the extended RAM 1116 will be described below.

Figure 44:
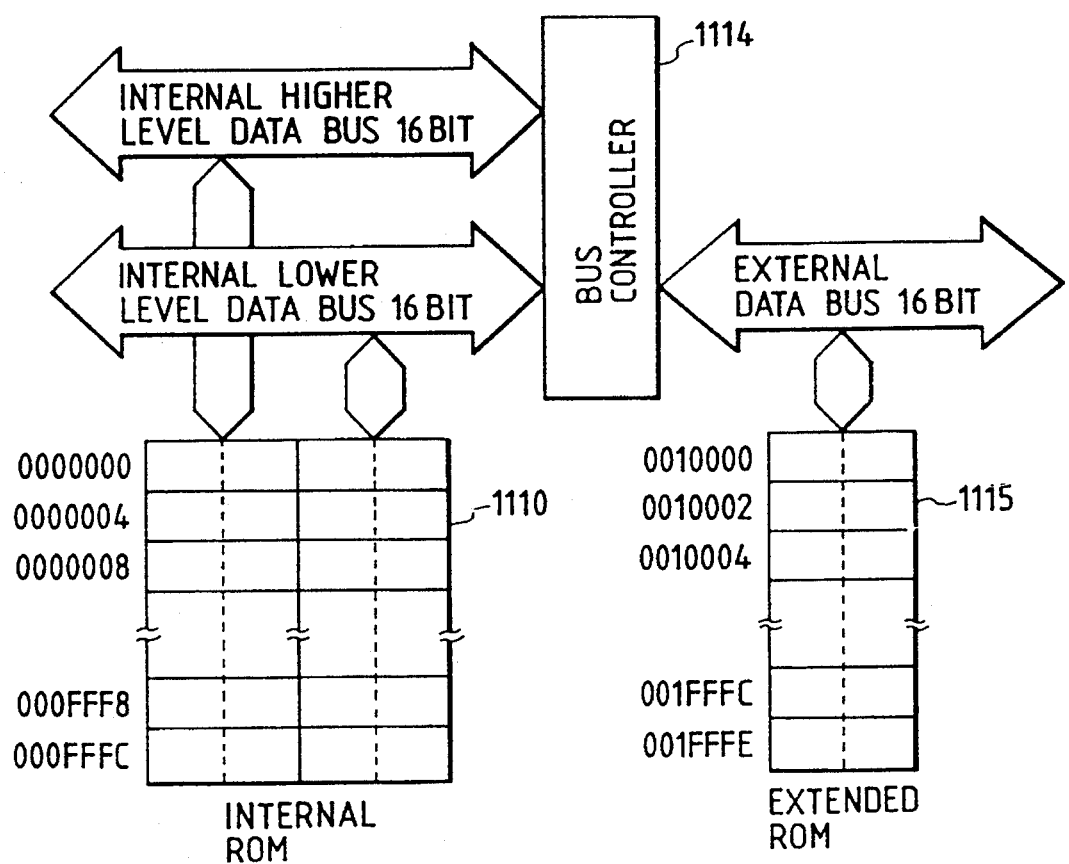
FIG. 44 is a flow chart showing an on-board self diagnosis process.

FIG. 44 is a diagram showing the structure of buses for a 32-bit one-chip microcomputer, the internal data bus being a 32 bit bus, the external data bus for extension being a 16 bit bus. In case of a one-chip microcomputer containing a peripheral I/O unit such as A/D converter, the bit number of external data bus for extension is generally a half or one-fourth of the bit number of the internal data bus in order to keep input/output pins for the peripheral I/O units. Therefore, 32-bit data is obtained by accessing twice the extended ROM 1115 using a bus controller 1114. Consequently, the access time requires twice as long as the time to access the internal ROM 1110. In a case where the microcomputer is of high speed such as a RISC type, since the response time of the extended ROM is generally slow compared to the access speed of the microcomputer, a waiting state cycle has to be inserted even when a 32-bit bus construction can be realized. As a result, the access time is lengthened by the same amount. Therefore, there is a problem that the speed to perform the program stored in the extended ROM 1115 decreases to one-half to one-fourth compared to the case of a 32-bit structure without a waiting state cycle. In order to solve the problem, a small capacity and high speed ROM 1110 or RAM 1111 is provided inside the microcomputer 1129 and connected to the CPU 1112 with a 23-bit bus to store a program having a high CPU load factor to be performed in the internal ROM. By means of the method, a massive program can be efficiently performed.

Figure 45:
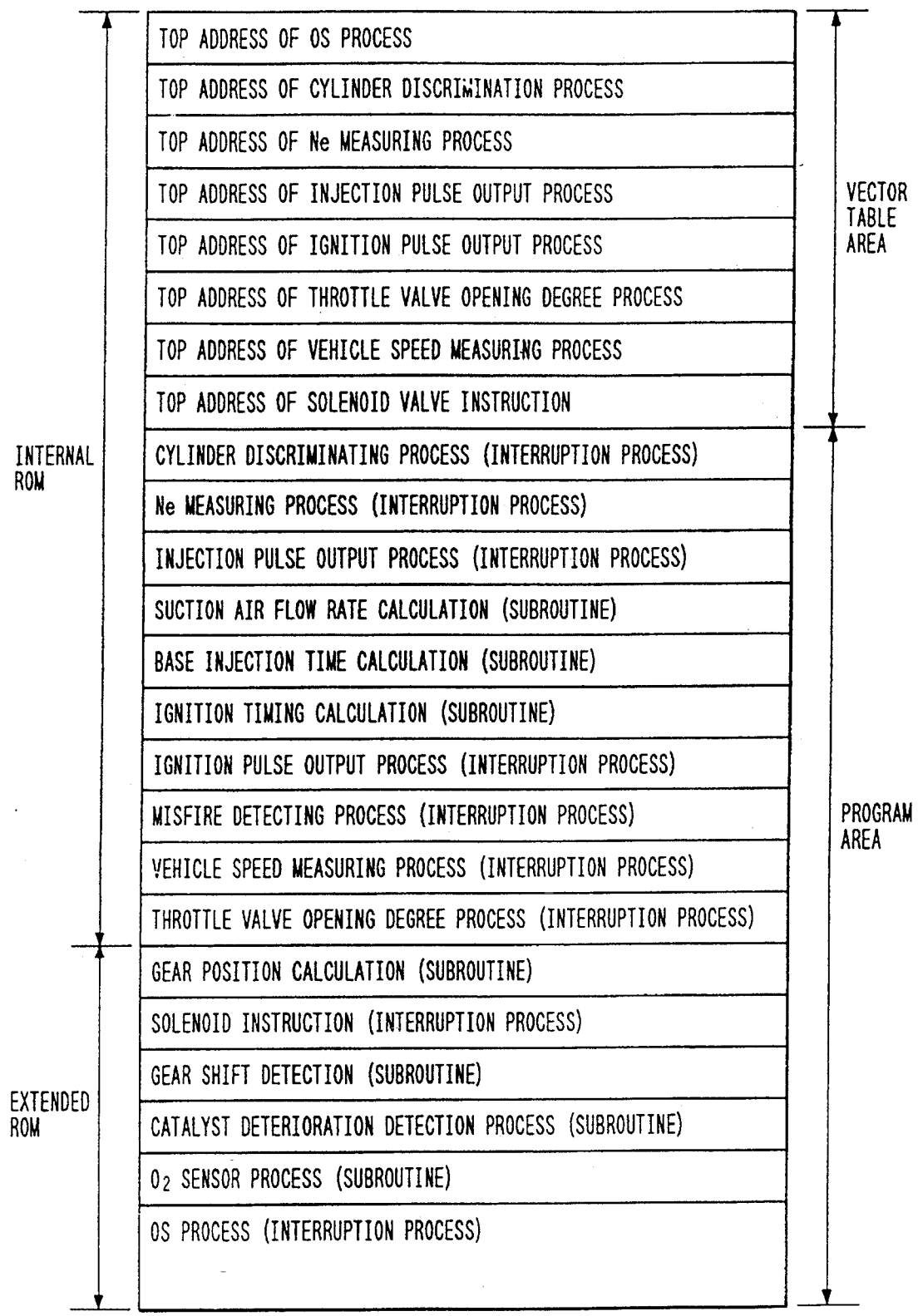
FIG. 45 is a chart showing the relationship between crank angle and engine rotating speed.

FIG. 45 shows an embodiment of the program allocation having high processing efficiency in the above construction. The vector table area indicating the top address for the interrupt process is the area referred to for every permission of interrupt. This access time occupies the large portion of the interrupt response time. Therefore, it is preferable to shorten the response time by using a high speed internal ROM 1110. Further, the processes 1300, 1301 and 1302 (refer to FIG. 37 and FIG. 38) having the highest CPU load factor among the above control programs, that is, the cylinder discrimination process, the base injection time calculating process and the ignition timing calculating process, are stored in the area of the internal ROM. In other words, the reason is that, providing that the CPU load factor using a high speed internal ROM 1110 is, for example, 50%, the CPU load factor using an external extended ROM 1115 becomes above 100% and other interrupt process cannot be executed. Similarly, the other processes are also stored in order of higher CPU load factor. By employing such a program allocation, the addresses in the area of the internal ROM storing the processes 1300, 1301 and 1302 are flagged against the external data bus and are processed every building-up or leading edge of the cylinder discrimination pulse signal REF. The addresses in the area of the extended ROM are flagged during the time when there is no interrupt factor.

On the other hand, in a case of employing a high speed internal RAM 1111, the programs having large CPU load factors as described above are initially stored in the extended ROM 1115, and these process programs may be transferred and booted up in the internal RAM 1111 to be processed when the microcomputer 1129 is reset. By doing so, the processing efficiency can be improved as well as in the case of employing the internal ROM 1110. In a case where a program in the extended ROM 1115 is transferred to and booted in the internal RAM 1111 to be processed, the vector table is referred to when an interrupt occurs. In that time, providing that the vehicle speed measuring process, for example, is booted in the internal RAM 1111, the address in the internal RAM to which the program is transferred needs to be written in the top address of the vector table.

Although the present invention has been described in its preferred embodiments, it should be understood that the present invention is not limited to the specific embodiments and that various design changes may be made without departing from the scope of the present invention described in the claims.

As it can be understood from the foregoing description, according to the present invention, a single-chip microcomputer used in vehicle control can easily cope with an increase in input/output ports or additional functions, and an application software program can continuously be used only by rewriting an interface software program, and further re-manufacturing of a core unit is unnecessary. Therefore, development of a control unit including programs becomes easy.

As it can be understood from the above description, the present invention can provide a total control system for a vehicle which makes the best possible use of the processing capacity of a high speed microcomputer, being capable of storing the control programs in the optimum area of a ROM or RAM depending on the load factor of the CPU, and constructing a low-cost and reasonable configuration in total using an external memory element, and is suitable for requiring massive capacity and real-time control such as a total control for the vehicle.

We claim:

1. A control unit for a vehicle having a plurality of peripheral systems for performing various kinds of functions using a micro-computer, comprising:

application software memory means for storing an application software program for controlling at least one of said peripheral systems;

interface software memory means having a first memory storing an interface software program for connecting said application software program with an operating system;

a central processing unit for performing a computation of the application software program and the interface software program; and a second memory storing computed data.

2. A control unit for controlling at least one peripheral system of a vehicle having a plurality of peripheral systems for performing various kinds of control using a micro-computer, comprising:

application software memory means for storing an application software program for controlling at least one of said peripheral systems;

interface software memory means having a first memory storing an interface software program for connecting said application software program with an operating system;

a central processing unit for performing a computation of the application software program and the interface software program;

a second memory storing computed data;

an I/O unit for extending computation and communication capacity of the control unit by coupling the control unit to additional memories, processing units and communication units; and communication means for communicating computed information to and from other processing units through a bus or local area network.

3. A control unit for a vehicle according to claim 2, further comprising at least one of an external I/O unit and an external memory means for extending processing capacity of said control unit.

4. A control unit for a vehicle according claim 3, wherein:

said external memory means stores the application software program.

5. A control unit for a vehicle according to claim 2, wherein said interface software program comprises:

digital filtering means for filtering an A/D converted signal and I/O processing means for converting the filtered signal to a function usable in the application software program.

6. The control unit for a vehicle according to claim 5, wherein said digital filtering means is a variable hard filter.

7. A control unit for a vehicle according to claim 5, wherein said digital filtering means is composed of a number of hard filters, said number being equal to a number of inputs to the control unit.

8. A control unit for controlling at least one peripheral system of a vehicle having at least two peripheral systems and at least two application software programs for performing control functions of said peripheral systems, said control unit comprising:

an internal memory means for said control unit, said internal memory means storing an interface software program for connecting a first of said at least two application software programs with an operating system and an external memory means for storing a second of said at least two application software programs.

9. A control system for controlling at least one peripheral system of a vehicle having a plurality of control units for said peripheral systems, each of said control units comprising at least application software memory means for storing an application software program for controlling at least one of said peripheral systems, interface software memory means having a first memory storing an interface software program for connecting said application software program with an operating system, a central processing unit for performing a computation of the application software program and the interface software program, a second memory storing computed data, an I/O unit for extending computation and communication capacity of the control unit by coupling it to additional memories, processing units and communication units, and communication means for communicating computed information to and from other processing units through a bus or local area network, wherein:

communication of information is provided between at least two of the plurality of control units, by means of a LAN.

10. A control system for controlling at least one peripheral system of a vehicle having a plurality of control units for said peripheral systems, each of said control units comprising at least application software memory means for storing an application software program for controlling at least one of said peripheral systems, interface software memory means having a first memory storing an interface software program for connecting said application software program with an operating system, a central processing unit for performing a computation of the application software program and the interface software program, a second memory storing computed data, an I/O unit for extending computation and communication capacity of the control unit by coupling it to additional memories, processing units and communication units, and communication means for communicating computed information to and from other processing units through a bus or local area network, wherein:

one of the control units is used as an I/O processing-only unit storing an interface software program in an internal ROM, the other of said control units being used as computing-only units storing application software programs in internal memories.

11. A control unit for a vehicle according to claim 1, wherein said interface software program comprises:

digital filtering means for filtering an A/D converted signal and I/O processing means for converting the filtered signal to a function usable in the application software program.

12. The control unit for a vehicle according to claim 11, wherein said digital filtering means is a variable filter comprising hardware elements.

13. A control unit for a vehicle according to claim 11, wherein said digital filtering means is composed of a number of filters comprising hardware elements, said number being equal to a number of inputs to the control unit.

14. A control system for controlling at least one peripheral system of a vehicle, said control system having a one-chip micro-computer having an internal ROM, an external ROM, means for receiving an interrupt signal in one of a constant cycle and synchronized to an output pulse from a rotating sensor, wherein:

at least one of addresses written in an interrupt vector table is an area of the internal ROM.

15. A control unit for controlling at least one peripheral system of a vehicle having an interface software program which comprises a basic processing function, formed by defining and designating an I/O variable as a directory utilized in developing or modifying an application software program.

16. A control system for controlling at least one peripheral system of a vehicle, said control system having a one-chip micro-computer having an internal RAM, an external ROM, means for receiving an interrupt signal in one of a constant cycle and synchronized to an output pulse from a rotating sensor, wherein:

at least one of addresses written in an interrupt vector table is an area of the internal RAM.

17. A control system for controlling at least one peripheral system of a vehicle, said control system having a one-chip micro-computer with an internal ROM, an external ROM, means for receiving an interrupt signal in one of a constant cycle and synchronized to an output pulse from a rotating sensor, wherein:

said internal ROM stores at least one interrupt processing program.

18. A control system for a vehicle according to claim 17, wherein:

said interrupt processing program is a program having a largest CPU load factor.

19. A control system according to claim 17, wherein said external ROM has a plurality of application programs stored therein, in an increasing order of CPU load factor.

20. A control system for controlling at least one peripheral system of a vehicle, said control system having a one-chip micro-computer with an internal RAM, means for receiving interruption in one of a constant cycle and synchronized to an output pulse from a rotating sensor, wherein:

said internal RAM stores and performs at least one interrupt processing program.

21. A control system for a vehicle according to claim 20, wherein:

said interrupt processing program is a program having a largest CPU load factor.

22. A control system for a vehicle according to claim 20, comprising:

reset interruption processing means in the one-chip micro-computer for performing a process to transfer an interrupt program to said internal RAM.

23. A control system according to claim 20 further comprising:

an internal ROM and an external ROM, said external ROM having a plurality of application programs stored therein, in increasing order of CPU load factor.

24. A control system for controlling at least one peripheral system of a vehicle, said control system having a one-chip; micro-computer with an internal ROM, an external ROM, means for receiving an interrupt signal in one of a constant cycle and synchronized to an output pulse from a rotating sensor, wherein:

said internal ROM stores an interrupt vector table.

25. A control system according to claim 24, wherein said external ROM has a plurality of application programs stored therein, in an increasing order of CPU load factor.

* * * * *